US012564841B2

(12) United States Patent
Reznitchenko et al.

(10) Patent No.: US 12,564,841 B2
(45) Date of Patent: Mar. 3, 2026

(54) HYDRAULIC SYSTEM FOR A ROLLER CRUSHER

(71) Applicant: Metso USA Inc., Brookfield, WI (US)

(72) Inventors: Vadim Reznitchenko, Mechanicsburg, PA (US); Paulo Barscevicius, Sorocaba (BR)

(73) Assignee: Metso USA Inc., Brookfield, WI (US)

( * ) Notice: Subject to any disclaimer, the term of this patent is extended or adjusted under 35 U.S.C. 154(b) by 535 days.

(21) Appl. No.: 18/073,653

(22) Filed: Dec. 2, 2022

(65) Prior Publication Data

US 2024/0181465 A1 Jun. 6, 2024

(51) Int. Cl.
*B02C 4/32* (2006.01)
*B02C 4/02* (2006.01)
*F04B 1/00* (2020.01)

(52) U.S. Cl.
CPC .................. *B02C 4/32* (2013.01); *B02C 4/02* (2013.01); *F04B 1/00* (2013.01)

(58) Field of Classification Search
CPC .. B02C 4/32; B02C 4/02; B02C 4/426; B02C 4/28; B02C 23/04; F04B 1/00
See application file for complete search history.

(56) References Cited

U.S. PATENT DOCUMENTS 5,722,605 A * 3/1998 Finken ...................... B02C 4/34 241/231
2003/0217639 A1 11/2003 Ferguson et al.
2012/0056027 A1* 3/2012 Euculano .................. B02C 4/32 100/168
2022/0331811 A1* 10/2022 Guerrero Palma ....... B02C 4/02

FOREIGN PATENT DOCUMENTS

| | | | |
|---|---|---|---|
| DE | 946767 | C | 8/1956 |
| DE | 1079930 | B | 4/1960 |
| DE | 2230092 | A1 | 12/1972 |
| DE | 3705050 | A1 | 9/1988 |
| DE | 102016221227 | A1 | 5/2018 |

(Continued)

OTHER PUBLICATIONS

International Search Report and Written Opinion for International Application No. PCT/US2022/034446 mailed Oct. 19, 2022.

(Continued)

*Primary Examiner* — Patrick C Williams
(74) *Attorney, Agent, or Firm* — Andrus Intellectual Property Law, LLP

(57) ABSTRACT

A hydraulic system for a roller crusher comprising at least one first main actuator connectable to a first movable bearing housing of the roller crusher, at least one second main actuator connectable to a second movable bearing housing of the roller crusher, a first crossing actuator operationally coupled to the at least one first actuator, and a second crossing cylinder operationally coupled to the at least one second main actuator. A first compression chamber of the first crossing cylinder is fluidly connected to a second rebound chamber of the second crossing cylinder, and a first rebound chamber of the first crossing cylinder is fluidly connected to a second compression chamber of the second crossing cylinder.

20 Claims, 9 Drawing Sheets

(56) References Cited

FOREIGN PATENT DOCUMENTS

| | | | |
|---|---|---|---|
| FR | 2143046 | A1 | 2/1973 |
| GB | 855636 | A | 12/1960 |
| WO | 2008063104 | A1 | 5/2008 |
| WO | 2021023643 | A1 | 2/2021 |

OTHER PUBLICATIONS

Office Action and Search Report for Swedish Patent Application No. 2150814-8, dated Feb. 15, 2022.

International Search Report and Written Opinion for International Application No. PCT/US2023/081756, mailed May 3, 2024.

* cited by examiner

HYDRAULIC SYSTEM FOR A ROLLER CRUSHER

BACKGROUND

Roller crushers are used for the comminution of material, e.g. ores. The comminution of material happens in-between two rollers, which together defines a crushing gap, where material to be crushed is introduced. The rollers are installed in a machine frame via bearing housings. Each roller may be provided with one, two or more independent bearing housings. During comminution of material large forces are constantly applied on the material and in return the rollers crushing the material. To assure the roller crusher is not damaged by these forces, one of the rollers is installed in fixed bearing housings, i.e. bearing housings which are fixed in relation to the machine frame, and the other roller is installed in movable bearing housings, i.e. bearing housings which may move in relation to the machine frame. Consequently, the roller crusher comprises a movable roller and a fixed roller. Thus, when a large load is applied on the rollers, the movable roller may move away from the fixed roller, which in return widens the crushing gap and lessens the load. However, to assure the movable roller returns to its optimal crushing position, and delivers a sufficient crushing pressure during operation, the floating roller is biased towards the fixed roller via a hydraulic system. The hydraulic system biases the movable roller by delivering a force to the movable bearing housings of the movable roller. However, since the movable bearing housings are independent from each other the movement of the moveable roller may lead to skewing, i.e. the two rollers become unparallel. Skewing may for example happen if a feed of material is unevenly distributed when entering the crushing gap or if material having varying properties, such as moisture content, enters the crusher or if a tramp event occurs.

Skewing of the floating roller may compromise seals, and in some cases where flanges are installed on one of the rollers, skewing may lead to unwanted contact between the roller and the flanges. Thus, making it hard to use flanged rollers if skewing is an issue.

SUMMARY

It is an object of the present invention to provide a solution for preventing or at least reducing skewing in rollers crusher which is furthermore flexible and easily adaptable to a wide variety of roller crushers.

According to a first aspect, this and other objects are achieved by a hydraulic system for a roller crusher comprising a machine frame, a fixed roll supported by one or more fixed bearing housings fixed relative to the machine frame, a movable roll supported by first and second movable bearing housings movable relative to the machine frame, and wherein the fixed roll and the movable roll defines a crushing gap for receiving material to be comminuted, the hydraulic system comprising:

- at least one first main actuator connectable to the first movable bearing housing, each of the at least one first main actuator comprising a first main cylinder having a first main hydraulic chamber formed therein, and a first main piston which extends into the first main cylinder, wherein the at least one first main actuator is configured to exert a force along a first axis resulting in a force on the first movable bearing housing,
- at least one second main actuator connectable to the second movable bearing housing, each of the at least one second main actuator comprising a second main cylinder having a second main hydraulic chamber formed therein, and a second main piston which extends into the second main cylinder, wherein the at least one second main actuator is configured to exert a force along a second axis parallel to the first axis resulting in a force on the second movable bearing housing,
- a first crossing actuator comprising a first crossing cylinder having a first synchronizing hydraulic chamber formed therein, and a first synchronizing piston which extends into the first synchronizing hydraulic chamber, wherein the first synchronizing piston comprises a first synchronizing piston element separating the first synchronizing hydraulic chamber into a first compression chamber and a first rebound chamber,
- a second crossing actuator comprising a second crossing cylinder having a second synchronizing hydraulic chamber formed therein, and a second synchronizing piston which extends into the second synchronizing hydraulic chamber, wherein the second synchronizing piston comprises a second synchronizing piston element separating the second synchronizing hydraulic chamber into a second compression chamber and a second rebound chamber,
- wherein the first crossing actuator is operationally coupled to the at least one first main actuator, and the second crossing actuator is operationally coupled to the at least one second main actuator, and
- wherein the first compression chamber is fluidly connected to the second rebound chamber and the first rebound chamber is fluidly connected to the second compression chamber.

Consequently, a hydraulic system is provided where movement of the first main piston(s) of the at least one first main actuator and the second main piston(s) of the at least one second main actuator are synchronized via the operational coupling to the first crossing actuator and the second crossing actuator, respectively. The movement of the synchronizing pistons is synchronized by the first rebound chamber being fluidly connected to the second compression chamber, and the second rebound chamber being fluidly connected to the first compression chamber, thus when the volume of the first rebound chamber is compressed, e.g. when the first synchronizing piston moves along the first axis, fluid is transferred to the second compression chamber which expands the volume of the second compression chamber, and thus moving the second synchronizing piston in sync with the first synchronizing piston. Furthermore, since the main actuators are operationally coupled to the crossing actuators, the movement of these are also synchronized. Synchronizing the movement between the actuators assures that when the hydraulic system is connected to a roller crusher, movement of the movable bearing housings is synchronized, thus avoiding skewing of the roller. Furthermore, only the main actuators need to contribute to the crushing force exerted along the first axis and the second axis, while the crossing actuators need only to synchronize movement of the different pistons. This further simplifies hydraulic wiring needed for the hydraulic system.

The first synchronizing hydraulic chamber and the second synchronizing hydraulic chamber are preferably formed with the same dimensions, thus leading to the volume of the first compression chamber and the first rebound chamber matching that of the second compression chamber and the second rebound chamber, respectively.

In the context of this disclosure when components are described as operationally coupled it is to be understood as when the components are operated, they are mechanically coupled together. Thus, the operational coupling between the at least one main actuator and its associated crossing actuator as used herein means that a shift in displacement length of the at least one main actuator will cause the same shift in displacement length of the crossing actuator operationally coupled thereto, and vice versa. This implies that the first crossing actuator is configured to exert a force along the first axis, and that the second crossing actuator is configured to exert a force along the second axis. As readily appreciated by the person skilled in the art, this may be achieved by connecting the main piston of a main actuator with the synchronizing piston of an associated crossing actuator. However, it may alternatively be achievable by connecting a main piston of a main actuator to a crossing cylinder of an associated crossing actuator. In other words, the cylinders may not necessarily be arranged in the reference frame of the movable bearing housings. Instead, a piston may be “stationary”, i.e. in the reference frame of the roller crusher frame, and its associated cylinder may be arranged to move along with the movable bearing housing. Alternatively, the at least one main actuator and its associated crossing actuator may be operationally coupled to each other while being spaced apart. For example, the at least one main actuator and its associated crossing actuator may be arranged in parallel with each other cach being individually coupled to a movable bearing housing. As readily appreciated by the person skilled in the art, any movement of the movable bearing housing will cause the same movement of the at least one main actuator and its associated crossing actuator.

In the context of this disclosure when components are described as connected it is not to only be interpreted as a direct connection between the components, the connection may also be an indirect connection achieved via intermediate components. Such intermediate components could be brackets, shims or the like, but could also be larger components, such as e.g. a movable bearing housing as detailed hereinabove.

According to some embodiments, the first main piston(s) of the at least one first main actuator is configured to deliver the force along the first axis to the first synchronizing piston and/or the second main piston(s) of the at least one second main actuator is configured to deliver the force along the second axis to the second synchronizing piston.

This may be beneficial as it simplifies the construction, as the main cylinder(s) and the crossing cylinder may be stationary in relation to each other, hence making the communication of hydraulic fluid between the cylinders less technically demanding.

The main cylinder(s) of an at least one main actuator and the synchronizing cylinder may be operationally coupled without forming a connection locking between them. Not locking a main piston together with a synchronizing piston may case the assembling and disassembling of the hydraulic system, which may prove especially advantageous when mounting the hydraulic system on a roller crusher.

According to some embodiments, the at least one first main actuator is a first main actuator and wherein said first main actuator and the first crossing actuator are coaxially arranged with respect to each other about the first axis, and/or the at least one second main actuator is a second main actuator and wherein said second main actuator and the second crossing actuator are coaxially arranged with respect to each other about the second axis.

This is an example of an embodiment having only one first main actuator and only one second main actuator. Thus, there are one pair of main actuator and associated crossing actuator on each side of the roller crusher. As will be seen later, the disclosure is not limited to these embodiments, and it is conceivable to provide more than one main actuator on each side of the roller crusher.

This implies that the first main hydraulic chamber and the first synchronizing hydraulic chamber, together, extend radially outwardly from the first axis. In other words, one of the first main hydraulic chamber and the first synchronizing hydraulic chamber may be disposed in a central portion intersected by the first axis, whereas the other one of the first main hydraulic chamber and the first synchronizing hydraulic chamber may enclose the same radially outwardly therefrom.

The coaxial arrangement implies that one of the main actuator and the crossing actuator has a hollow central portion externally thereof, and that the other one of the main actuator and the crossing actuator is arranged within said hollow central portion.

Consequently, a very space efficient set-up between the main actuators and the crossing actuators is achieved. Furthermore, the coaxial arrangement may further facilitate the operational coupling between the synchronizing actuators and the main actuators.

According to some embodiments, the first main actuator is arranged radially outwardly in relation to the first crossing actuator, and/or the second main actuator is arranged radially outwardly in relation to the second crossing actuator.

This implies that the first main actuator encircles the first crossing actuator and that the second main actuator encircles the second crossing actuator. The radial direction is here defined with reference to the first and second axis, respectively.

Arranging the main actuators radially outwardly from the crossing cylinders may be advantageous, since it provides easier access to the hydraulic system for the main actuators.

According to some embodiments, the first main cylinder has an annular cross section and the first crossing cylinder has a circular cross section, and/or wherein the second main cylinder has an annular cross section and the second crossing cylinder has a circular cross section. The cross sections are defined transverse to the first and second axis, respectively.

This implies that the first and/or second main cylinder has the shape of a hollow cylinder extending from an inner diameter to an outer diameter thus defining an external opening in the center thereof. A symmetry axis of the hollow cylinder is the first or second axis, respectively.

According to some embodiments, the first crossing actuator is arranged radially outwardly in relation to the first main actuator, and/or the second crossing actuator is arranged radially outwardly in relation to the second main actuator.

This implies that the first crossing actuator encircles the first main actuator and that the second crossing actuator encircles the second main actuator. The radial direction is here defined with reference to the first and second axis, respectively.

Arranging the main actuators radially outwardly from the crossing cylinders may be advantageous, since it provides easier access to the hydraulic system for the crossing actuators.

According to some embodiments, the first main cylinder has a circular cross section and the first crossing cylinder has an annular cross section, wherein the second main cylinder has a circular cross section and the second crossing cylinder has an annular cross section.

This implies that the first and/or second crossing cylinder has the shape of a hollow cylinder extending from an inner diameter to an outer diameter thus defining an external opening in the center thereof. A symmetry axis of the hollow cylinder is the first or second axis, respectively.

According to some embodiments, the at least one first main actuator is a first main actuator, said first main actuator being arranged axially with the first crossing actuator, one after each other, along the first axis, and wherein the at least one second main actuator is a second main actuator, said second main actuator being arranged axially with the second crossing actuator, one after each other, along the second axis.

This is another example of an embodiment having only one first main actuator and only one second main actuator. Thus, there are one pair of main actuator and associated crossing actuator on each side of the roller crusher. As will be seen later, the disclosure is not limited to these embodiments, and it is conceivable to provide more than one main actuator on each side of the roller crusher.

This implies that the first main actuator and the first crossing actuator extends lincarly along the first direction. It further implies that the second main actuator and the second crossing actuator extends linearly along the second direction.

The first main actuator may be operationally coupled to the first crossing actuator by the first main piston being connected to, coupled to, or attached to, the first crossing piston along the first axis.

The axial arrangement may be beneficial since it allows casier access to both the main and the crossing actuators from the outside. Maintenance may be easier, since there is no need to disassemble both the main and the crossing cylinders. From a structural perspective, the axial arrangement may be beneficial since it allows to use smaller dimensions for the main cylinders.

According to some embodiments, the machine frame comprises a support structure for the hydraulic system, said support structure having a first side which faces the movable roller and a second, opposite, side facing away from the movable roller.

According to some embodiments, the first main cylinder is configured to be arranged on the first side of the support structure and the first crossing cylinder is configured to be arranged on the second side of the support structure, and wherein the first main piston and the first synchronizing piston are configured to interconnect with each other via a first opening of the support structure, and wherein the second main cylinder is configured to be arranged on the first side of the support structure and the second crossing cylinder is configured to be arranged on the second side of the support structure, and wherein the second main piston and the second synchronizing piston are configured to interconnect with each other via a second opening of the support structure.

The first and/or second openings may be through-openings, or through-holes formed in the support structure. Such through-openings, or through-holes may extend along the first and/or second axis and interconnect the first side and the second side of the support structure. The first and/or second openings may alternatively be recesses formed in the support structure from a direction being transverse to the first and/or second axis. The person skilled in the art realizes that there are many alternative ways to allow operational coupling between the main and crossing actuators when being disposed on opposite sides of the support structure.

Arranging the main and crossing actuators on opposite sides of the support structure may be beneficial since it allows separating the two actuators from each other, thus facilitating easier maintenance. Arranging the crossing cylinders on the second side which faces away from the movable roller may further aid protecting the crossing cylinders from impinging crushing material.

According to some embodiments, the at least one first main actuator comprises two first main actuators which are configured to be arranged in parallel with and vertically offset from each other at the first movable bearing housing, wherein the at least one second main actuator comprises two second main actuators which are configured to be arranged in parallel with and vertically offset from each other at the second movable bearing housing, wherein the first crossing actuator is connectable to the first movable bearing housing and configured to be arranged in parallel with and between the two first main actuators, and wherein the second crossing actuator is connectable to the second movable bearing housing and configured to be arranged in parallel with and between the two second main actuators.

This is an example of an embodiment having more than one main actuator on each side of the roller crusher. As readily appreciated by the person skilled in the art, roller crushers may have one, two or even more actuators on each side of the roller crusher for controlling the movement of the movable roll.

The two main actuators on each side may be structured to and configured such that their respective force exerted onto the movable bearing housing at that side have the same or at least substantially the same magnitude. This implies that the two main actuators on each side may have the same dimensions and/or the same properties. Thus, the two main actuators may be of the same type, or even identical to each other.

The embodiment may be advantageous as it allows physically separating the main actuators and the crossing actuators from each other while still maintaining an even load distribution on the movable bearing housing. By arranging the main actuators parallel with and vertically offset from each other at the movable bearing housing, and by controlling each of the two main actuators so that they exert a force of the same magnitude onto the movable bearing housing, the resulting force on the movable bearing housing will be located between the two main actuators. By arranging the crossing actuator at that same position, the main actuators and the crossing actuator may operationally couple to each other using an even force distribution even if they are not physically arranged linearly along the first/second axis.

According to some embodiments, the machine frame comprises a support structure for the hydraulic system, said support structure having a first side which faces the movable roll and a second, opposite, side facing away from the movable roll, wherein the first main cylinders of the two first main actuators are configured to be arranged on the first side of the support structure and the first crossing cylinder is configured to be arranged on the second side of the support structure, and wherein the first synchronizing piston is connectable to the first movable bearing housing via a first opening of the support structure, and wherein the second main cylinders of the two second main actuators are configured to be arranged on the first side of the support structure and the second crossing cylinder is configured to be arranged on the second side of the support structure, and wherein the second synchronizing piston is connectable to the second movable bearing housing via a second opening of the support structure.

The first and/or second openings may be through-openings, or through-holes formed in the support structure. Such through-openings, or through-holes may extend along the first and/or second axis and interconnect the first side and second sides of the support structure. The first and/or second openings may alternatively be recesses formed in the support structure from a direction being transverse to the first and/or second axis. The person skilled in the art realizes that there are many alternative ways to allow operational coupling between the main and crossing actuators when being disposed on opposite sides of the support structure.

Arranging the main and crossing actuators on opposite sides of the support structure may be beneficial since it allows further separating the main actuators from the crossing actuator, thus facilitating easier maintenance of each actuator. Arranging the crossing cylinders on the second side which faces away from the movable roller may further aid protecting the crossing cylinders from impinging crushing material.

Alternatively, the crossing cylinder may be arranged on the same side as the main cylinders, i.e. on the first side of the support structure.

According to some embodiments, the first main cylinders of the two first main actuators and the first crossing cylinder are each configured to be arranged on the first side of the support structure, and the second main cylinders of the two second main actuators and the second crossing cylinder are each configured to be arranged on the first side of the support structure.

This may be advantageous as it removes the need for openings in the support structure. It may also provide a more compact hydraulic system.

Needless to say, there are numerous ways to operationally couple the crossing actuator to the at least one main actuator. As yet a further example, the crossing actuator may be configured to be arranged between the fixed bearing housing and the movable bearing housing interconnecting the same. As readily appreciated by the person skilled in the art, the same principle will apply as for the other embodiments, because any movement of a movable bearing housing will result in a change in the gap between the fixed bearing housing and the movable bearing housing. If the crossing cylinder is arranged between the fixed bearing housing and the movable bearing housing and interconnects the same, the synchronizing piston will move in relation to the crossing cylinder, which will cause a movement of fluid to the opposite crossing cylinder.

According to some embodiments, the first synchronizing piston is connectable to the first movable bearing housing by means of a first bracket, and wherein the second synchronizing piston is connectable to the second movable bearing housing by means of a second bracket.

By providing dedicated brackets to each synchronizing piston, the mounting of the hydraulic system onto a roller crusher can be made easier. For the example embodiment, the synchronizing piston directly connects to the movable bearing housing via the bracket. This implies that the synchronizing piston extends through the opening in the frame. It is however also conceivable that the synchronizing piston connects to the bracket via an intermediate structure, such as a lever.

According to some embodiments, a total cross-sectional area of the first main hydraulic chamber(s) of the at least one first main actuator is 1.5 to 9 times larger than a cross-sectional area of the first synchronizing chamber, and wherein a total cross-sectional area of the second main hydraulic chamber(s) of the at least one second main actuator is 1.5 to 9 times larger than a cross-sectional area of the second synchronizing chamber.

The applicant has found that by having a total cross-sectional area of the at least one first main hydraulic chamber being 1.5 to 9 times larger than a cross-sectional area of the first synchronizing chamber, the hydraulic chambers do not need an increase in diameter in comparison to the conventional hydraulic systems currently installed on roller crushers, in order to deliver a sufficient force to the roller crusher. Thus, facilitating the retrofitting of the hydraulic system, and minimizing the changes needed in a manufacturing facility for manufacturing hydraulic systems and roller crushers with a hydraulic system according to the disclosure.

According to some embodiments, the fluid connection between the first compression chamber and the second rebound chamber forms a first closed fluid circuit and the fluid connection between the first rebound chamber and the second compression chamber forms a second closed fluid circuit.

Consequently, the synchronization of movement of the piston may be achieved autonomous without the need for external control, as the operation of the crossing cylinders will always be synchronized. This also further simplifies the hydraulic wiring needed in the system. In some cases, relieve valves may be connected to the first closed fluid circuit and the second closed fluid circuit to have a failsafe.

According to some embodiments, the hydraulic system comprises one or more hydraulic accumulators in fluid connection with the first main hydraulic chamber of each of the at least one first main actuator and/or the second main hydraulic chamber of each of the at least one second main actuator.

Hydraulic accumulators may help in providing additional force to the main cylinders and/or stabilizing the force delivered by the main cylinders.

According to some embodiments, the first synchronizing piston and the first synchronizing piston element are integrally connected, and the second synchronizing piston and the second synchronizing piston element are integrally connected.

Consequently, it is assured that the piston elements do not move relative to the synchronizing pistons, thus assuring the movement of the synchronizing pistons are synchronized when fluid is moved between the rebound chambers and the compression chambers. Alternatively, the piston elements may be provided as seals on the synchronizing pistons. Providing the piston elements as seals may ease manufacturing of the synchronizing pistons, as seals may be added on a wide variety of pistons. Furthermore, seals are cheap and easily replaceable in case of wear and tear.

According to some embodiments, the first crossing cylinder is engaged with the first main cylinder to prevent movement of the first crossing cylinder relative to the first main cylinder in a first plane perpendicular to the first axis, and/or the second crossing cylinder is engaged with the second main cylinder to prevent movement of the second crossing cylinder relative to the second main cylinder in a second plane perpendicular to the second axis.

A crossing cylinder may be engaged with a respective main cylinder in different ways. They may be attached to each other, be geometrically locked to each other, or even be integrally formed by the same element.

During operation of a roller crusher large forces are present which may lead to vibrations or lateral forces, such forces may move the cylinders relative to each other, thus potentially impacting the synchronization of the movement between the main pistons. Consequently, by preventing movement of the crossing cylinders relative to the main cylinders, these negative effects may be eliminated or at least reduced.

According to some embodiments, the first main piston is connected with the first synchronizing piston and/or the second main piston is connected with the second synchronizing piston.

Consequently, allowing the main cylinders to be operationally coupled with the crossing cylinders. By connecting the main pistons together with the synchronizing pistons, it is assured that movement of the main pistons is always synchronized by the crossing cylinders. The connection between the main pistons and the synchronizing piston may be achieved by bolting or a locking engagement, e.g. a male-female connection.

According to some embodiments, the first main piston is integrally connected with the first synchronizing piston and/or the second main piston is integrally connected with the second synchronizing piston.

An integral connection may assure the main cylinders and the synchronizing cylinder are operationally coupled. An integral connection may be achieved by forming the main pistons together with the synchronizing pistons, or by welding and the main pistons together with the synchronizing pistons.

According to some embodiments, the first main cylinder and the first crossing cylinder are integrally formed as a first one-piece element and/or the second main cylinder and the second crossing cylinder are integrally formed as a second one-piece element.

According to a second aspect of the invention a roller crusher for comminution of material is provided, the roller crusher comprising:

- a machine frame,
- a fixed roll supported by fixed bearing housings, wherein the fixed bearing housings are fixed relative to the machine frame,
- a movable roll supported by movable bearing housings, wherein the movable bearing housings are movable relative to the machine frame, wherein the fixed roll and the movable roll defines a crushing gap for receiving material to be comminuted, and
- a hydraulic system according to the first aspect of the invention, wherein the hydraulic system is configured to deliver a force onto the movable bearing housing to bias the movable roll towards the fixed roll.

The different aspects of the present invention can be implemented in different ways described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependent claims.

Furthermore, it will be appreciated that embodiments described in connection with one of the aspects described herein may equally be applied to the other aspects.

BRIEF DESCRIPTION OF THE DRAWINGS

The above and/or additional objects, features, and advantages of the present invention, will be further elucidated by the following illustrative and non-limiting detailed description of embodiments of the present invention, with reference to the appended drawings, wherein:

FIG. 9 depicts each side of the roller crusher separately.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to convey the scope of the invention to the skilled person.

Figure 1:
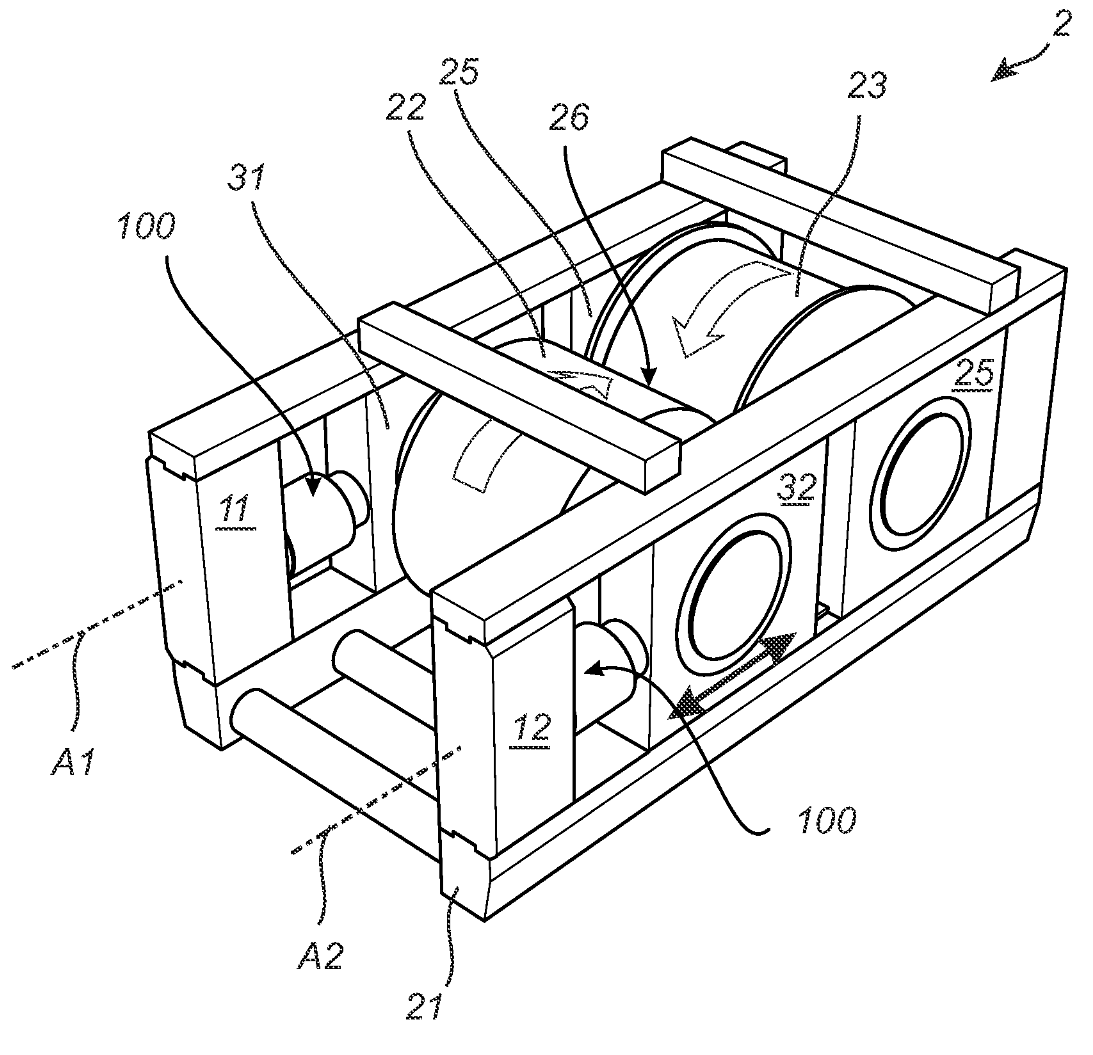
FIG. 1 depicts a perspective schematic view of an embodiment of a roller crusher according to a second aspect of the invention.

Referring initially to FIG. 1, which depicts a schematic perspective view of an embodiment of a roller crusher 2 according to a second aspect of the invention. The roller crusher 2 being for comminution of material, such as ore. The roller crusher 2 comprises a machine frame 21 supporting two rollers 22 and 23 of the roller crusher 2. The two rollers 22 and 23 are a fixed roll 23 and a movable roll 22. The fixed roll 23 is supported by fixed bearing housings 25. The fixed bearing housings 25 are placed on the machine frame 21. The fixed bearing housings 25 are fixed relative to the machine frame 21. The movable roll 22 is supported by two movable bearing housings 31 and 32. A first movable bearing housing 31 and a second movable bearing housing 32. The two movable bearing housings 31 and 32 are movable relative to the machine frame 21. The first movable bearing housing 31 is movable along a first axis A1 and the second movable bearing housing 32 is movable along a second axis A2. In the shown embodiment, the first axis A1 is parallel to the second axis A2. The fixed roll 23 and the movable roll 22 defines a crushing gap 26 for receiving material to be comminuted. In connection with the two movable bearing housings 31 and 32 is a hydraulic system 100. The hydraulic system 100 is only one of many example embodiments disclosed herein, and the person skilled in the art will appreciate how the later disclosed example embodiments may be arranged on a roller crusher according to the second aspect. The hydraulic system 100 is configured to deliver a force onto the movable bearing housings 31 and 32 to bias the movable roll 22 towards the fixed roll 23. During operation, the movable roll 22 may move along the first axis A1 and the second axis A2 in order to increase or decrease the crushing gap 26 between the fixed roll 23 and the movable roll 22. The hydraulic system 100 will be explained in greater detail with reference to FIGS. 2 and 3A to D.

Figure 2:
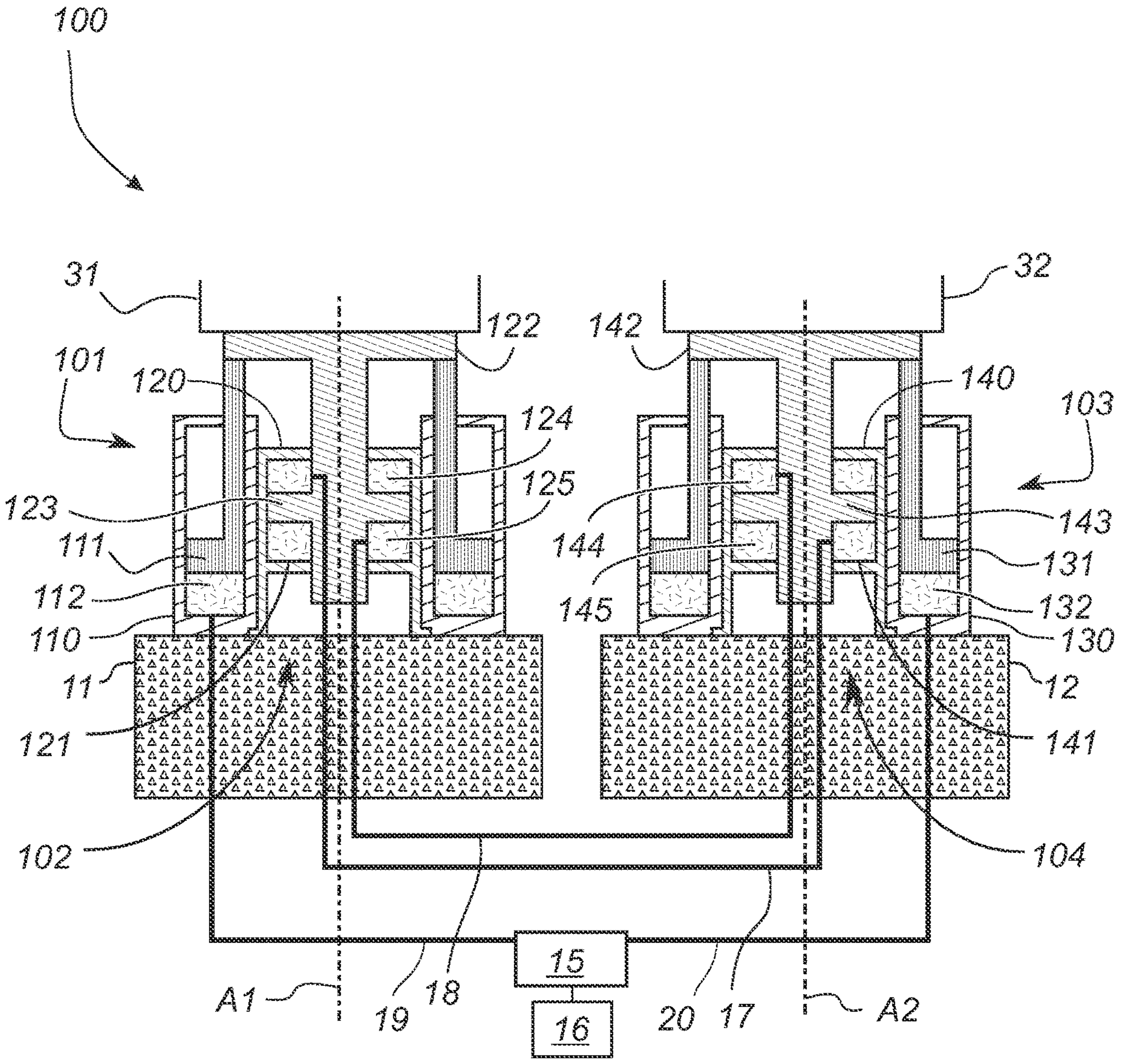
FIG. 2 depicts a schematic cross-sectional top view of an embodiment of a hydraulic system according to a first aspect of the invention connected to movable bearing housings of a roller crusher.

Referring to FIG. 2, which depicts a schematic cross-sectional top view of an embodiment of a hydraulic system 100 according to a first aspect of the disclosure connected to movable bearing housings 31 and 32 of a roller crusher, such as the roller crusher 2. The hydraulic system 100 comprises a first main actuator 101 and a second main actuator 103. The first main actuator 101 and the second main actuator 103 are indirectly connected to the first movable bearing housing 31 and the second movable bearing housing 32, respectively. The hydraulic system 100 is an example of a hydraulic system according to the disclosure which is based on the provision of one main actuator for each movable bearing housing (i.e. one main actuator for each side of the roller crusher). The hydraulic system according to the disclosure is however not limited to such embodiments, and alternative embodiments having more than one main actuator for each movable bearing housing will be described in detail later. The indirect connection for the first main actuator 101 is achieved via a first synchronizing piston 122 and for the second main actuator 103 via a second synchronizing piston 142. The first synchronizing piston 122 and the second synchronizing piston 142 abut the first movable bearing housing 31 and the second movable bearing housing 32, respectively. Alternatively, the first main actuator 101 and the second main actuator 103 may be directly connected to the first movable bearing housing 31 and the second movable bearing housing 32, respectively. The connection between the first movable bearing housing 31 and the first main actuator 101, assures that when the first main actuator 101 generates a force along the first axis A1 towards the first movable bearing housing 31, it results in a force on the first movable bearing housing 31. The connection between the second movable bearing housing 32 and second main actuator 103, assures that when the second main actuator 103 generates a force along the second axis A2 towards second movable bearing housing 32 it results in a force on the second movable bearing housing 32. The first main actuator 101 and the second main actuator 103 comprises a first main cylinder 110 and a second main cylinder 130, respectively. The first main actuator 101 and the second main actuator 103 further comprises a first main piston 111 and a second main piston 131, respectively. The first main piston 111 and the second main piston 131 are movable along the first axis A1 and the second axis A2, respectively. The first main piston 111 being for exerting a force along the first axis A1 resulting in a force on the first movable bearing housing 31. The second main piston 131 being for exerting a force along the second axis A2 resulting in a force on the second movable bearing housing 32. The first main cylinder 110 and the second main cylinder 130 has a first main hydraulic chamber 112 for controlling the force exerted by the first main piston 111, and a second main hydraulic chamber 132 for controlling the force exerted by the second main piston 131, respectively. The first main hydraulic chamber 112 and the second hydraulic chamber 132 are configured to accommodate a pressurized fluid, such as e.g. hydraulic oil. Pressurized fluid present within the first hydraulic chamber 112 is configured to deliver a fluid force onto the first main piston 111, which results in the first main piston 111 delivering a force onto the first movable bearing housing 31. Pressurized fluid present within the second hydraulic chamber 132 is configured to deliver a fluid force onto the second main piston 131, which results in the second main piston 131 delivering a force onto the second movable bearing housing 32. The fluid and the fluid pressure within the first main hydraulic chamber 112 and the second main hydraulic chamber 132 are in the shown embodiment controllable via a first hydraulic line 19 and second hydraulic line 20, respectively. The first hydraulic line 19 fluidly connects the first main hydraulic chamber 112 to a controller 15, and the second hydraulic line 20 fluidly connects the second main hydraulic chamber 132 to the controller 15. The controller 15 may control the fluid and the fluid pressure within the first main hydraulic chamber 112 and the second main hydraulic chamber 132. The controller 15 may control the fluid and the fluid pressure via hydraulic means 16, such as one or more pumps and/or one or more accumulators in fluid connection with the first hydraulic line 19 and the second hydraulic line 20. In other embodiments the first main hydraulic chamber 112 and/or the second main hydraulic chamber 132 is pressurized and fluidly sealed off, thus allowing the first main actuator 101 and/or the second main actuator 103 to provide a constant force onto the first movable bearing housing 31 and/or the second movable bearing housing 32, respectively.

The hydraulic system 100 further comprises a first crossing actuator 102 and a second crossing actuator 104 connected to the first movable bearing housing 31 and the second movable bearing housing 32, respectively. In the shown embodiment, the first crossing actuator 102 and the second crossing actuator 104 are directly connected to the first movable bearing housing 31 and the second movable bearing housing 32, respectively. Alternatively, the first crossing actuator 102 and/or the second crossing actuator 104 may be indirectly connected to the first movable bearing housing 31 and/or the second movable bearing housing 32, respectively. The indirect connection may be achieved via shims or via the main pistons 111 and 131. The first crossing actuator 102 comprises a first crossing cylinder 120 and a first synchronizing piston 122. The second crossing actuator 104 comprises a second crossing cylinder 140 and a second synchronizing piston 142. The first crossing cylinder 120 has a first synchronizing hydraulic chamber 121 and the second crossing cylinder 140 has a second synchronizing hydraulic chamber 141. The first synchronizing piston 122 and the second synchronizing piston 142 are movable along the first axis A1 and the second axis A2, respectively. The first synchronizing piston 122 abuts the first movable bearing housing 31, thus forming a connection between the first crossing actuator 102 and the first movable bearing housing 31. The first synchronizing piston 122 being for exerting a force along the first axis A1 resulting in a force on the first movable bearing housing 31. The second synchronizing piston 142 abuts the second movable bearing housing 32, thus forming a connection between the second crossing actuator 104 and the second movable bearing housing 32. The second synchronizing piston 142 being for exerting a force along the second axis A2 resulting in a force on the second movable bearing housing 32. For the example embodiment, the first synchronizing piston 122 and the second synchronizing piston 142 are operationally coupled to the first main piston 111 and the second main piston 131, respectively. In the shown embodiment the operational coupling is achieved by the main pistons 111 and 131 being configured to deliver a force along the first axis A1 and second axis A2 onto the synchronizing pistons 122 and 142. In the shown embodiment this is achieved by the first main piston 111 and the second main piston 131 directly abutting the first synchronizing piston 122 and the second synchronizing piston 142, respectively. Alternatively, shims or similar may be placed in-between the main pistons 111 and 131 and the synchronizing pistons 122 and 142. The operational coupling may alternatively be achieved by connecting the main pistons 111 and 131 to the synchronizing pistons 122 and 142 via e.g. bolting or welding. The operational coupling facilitates that the movement of the main pistons 111 and 131 is synchronized with the movement of the synchronizing pistons 122 and 142, e.g. when high loads are generated by material in the crushing gap 26, the operational coupling assures that the main pistons 111 and 131 moves in sync with the synchronizing pistons 122 and 142. The first synchronizing piston 122 and the second synchronizing piston 142 extends into the first synchronizing hydraulic chamber 121 and the second synchronizing hydraulic chamber 141, respectively. The first synchronizing piston 122 and the second synchronizing piston 142 comprises a first synchronizing piston element 123 and a second synchronizing piston element 143, respectively. The first synchronizing piston element 123 separates the first synchronizing hydraulic chamber 121 into a first compression chamber 124 and a first rebound chamber 125. The second main piston 143 element separates the second synchronizing hydraulic chamber 141 into a second compression chamber 144 and a second rebound chamber 145. Thus, when the first synchronizing piston 122 moves along the first axis A1, the first synchronizing piston element 123 also moves along the first axis A1. The movement of the first synchronizing piston element 123 along the first axis A1 changes the volumes of the first compression chamber 124 and the first rebound chamber 125. When the second synchronizing piston 142 moves along the second axis A2, the second synchronizing piston element 143 also moves along the second axis A2. The movement of the second synchronizing piston element 143 along the second axis A2 changes the volumes of the second compression chamber 144 and the second rebound chamber 145.

The first crossing actuator 102 and the second crossing actuator 104 are in the shown embodiment structured identically. However, the first crossing actuator 102 and the second crossing actuator 104 may differ structurally from each other.

The first compression chamber 124 is fluidly connected to the second rebound chamber 145 via a first synchronizing hydraulic line 17. The first rebound chamber 125 is fluidly connected to the second compression chamber 144 via a second synchronizing hydraulic line 18. The fluid connections between the compression chambers 124 and 144 and the rebound chambers 125 and 145 synchronize the movement of the first synchronizing piston 122 and the second synchronizing piston 142. The movements of the first synchronizing piston 122 and the second synchronizing piston 142 are synchronized by the fluid connections between the compression chambers 124 and 144 and the rebound chambers 125 and 145 keeping the volume ratio between the volume of the first rebound chamber 125 and the second compression chamber 144 and the volume of the second rebound chamber 145 and the first compression chamber 124 constant. This constant volume ratio assures that the first synchronizing piston 122 and the second synchronizing piston 142 moves in sync with each other. Thus, when the first compression chamber 124 is compressed, due to the first synchronizing piston 122 moving, fluid is transferred from the first compression chamber 124 to the second rebound chamber 145, thus expanding the second rebound chamber 145 and leading to a compression of the second compression chamber 144, which results in the second synchronizing piston 142 moving in sync with the first synchronizing piston 122. Consequently, the fluid connection between the compression chambers 124 and 144 and the rebound chambers 125 and 145 assures that the synchronizing pistons 122 and 142 move in sync with each other. In the illustrated example embodiment, the first fluid connection 17 between the first compression chamber 124 and the second rebound chamber 145 form a first closed fluid circuit and the second fluid connection 18 between the first rebound chamber 125 and the second compression chamber 144 form a second closed fluid circuit.

Figure 3A:
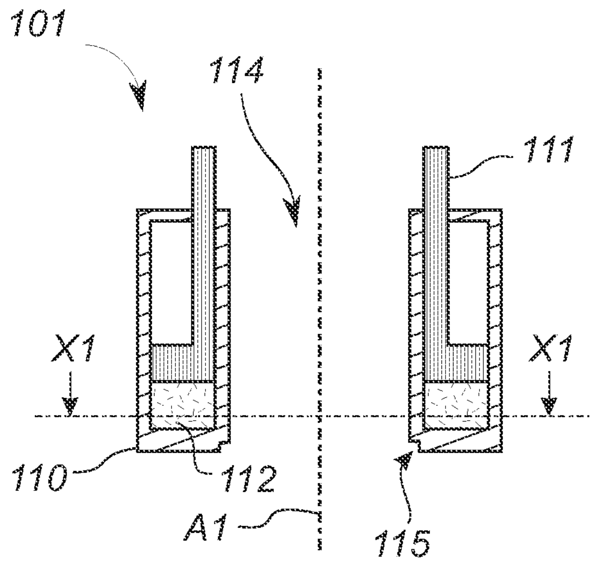
FIG. 3A depicts a schematic cross-sectional top view of the first main cylinder of the hydraulic system of FIG. 2.
Figure 3B:
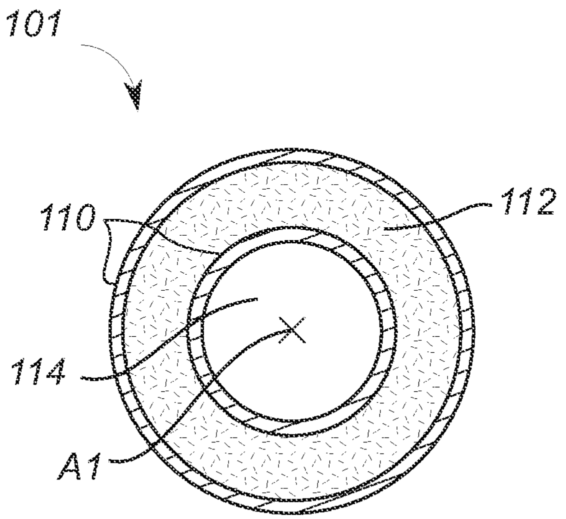
FIG. 3B depicts a schematic cross-sectional view along a section taken along the line X1-X1 of FIG. 3A.

Reference is now made to FIGS. 3A to 3D, where FIG. 3A depicts a schematic cross-sectional top view of the first main actuator 101 according to the example embodiment of FIG. 2, and FIG. 3B depicts a schematic cross-sectional view of the main actuator 101 taken along the line X1-X1 (see FIG. 3A). The following description with reference to the first main actuator 101 and the first crossing actuator 102 is equally applicable to the second main actuator 103 and the second crossing actuator 104, respectively. The first main actuator 101 is hollow and defines a first external opening 114. The first external opening 114 is configured to receive the first crossing actuator 102. As can be seen in FIG. 2. and 3A-D, the first main actuator 101 and the first crossing actuator 102 are coaxially arranged with respect to each other about the first axis A1. Likewise, the second main actuator 103 and the second crossing actuator 104 are coaxially arranged with respect to each other about the second axis A2. Consequently, a very space efficient setup between the main actuators 101, 103 and the crossing actuators 102, 104 is achieved. Furthermore, the coaxial arrangement arranging the crossing actuators 102, 104 at least partly within the main actuators 101, 103 may further facilitate an operational coupling between the same. For the example embodiment presented in FIGS. 2 and 3A-3D, the first main actuator 101 is arranged radially outwardly in relation to the first crossing actuator 102, and the second main actuator 103 is arranged radially outwardly in relation to the second crossing actuator 104. In other words, the first main actuator 101 encircles the first crossing actuator 102 and the second main actuator 103 encircles the second crossing actuator 104. Specifically, the first main cylinder 110 has the shape of a hollow cylinder extending from an inner diameter to an outer diameter thus defining an external opening 114 in the center thereof. This is most clearly illustrated in FIGS. 3B and 3D. The same figures also illustrate that the first main cylinder 110 has an annular cross section and the first crossing cylinder 120 has a circular cross section. By dimensioning the main 110, 130 and crossing 120, 140 cylinders such that the circular cross section of the crossing cylinder 120, 140 geometrically complements the dimensions of the first external opening 114 of the main cylinder 110, 120, the crossing cylinder 120, 140 can be received into the first external opening 114 of the main cylinder 110, 130 in an engaging manner. Likewise, although not illustrated in FIGS. 3B and D, the second main cylinder 130 has an annular cross section and the second crossing cylinder 140 has a circular cross section. The cross sections are defined transverse to the first A1 and second A2 axis, respectively.

A cross-sectional area of the first main hydraulic chamber 112 is 1.5 to 9 times larger than a cross-sectional area of the first synchronizing chamber 121, and a cross-sectional area of the second main hydraulic chamber 132 is 1.5 to 9 times larger than a cross-sectional area of the second synchronizing chamber 141. The cross-sectional areas are defined transverse to the first A1 and second A2 axis, respectively. Furthermore, formed in the first main cylinder 110 is a circular groove 115 (see FIG. 3A). The circular groove 115 may facilitate a locking engagement between a first crossing cylinder 120 received in the first external opening 114 and the first main cylinder 110. This locking engagement may be achieved by providing the first crossing cylinder 120 with one or more protrusions 126 (see FIG. 3C), which matches that of the circular groove 115, thus the one or more protrusions 126 of the first crossing cylinder 120 may engage the circular groove 115 of the first main cylinder 110. The locking engagement between the one or more protrusions 126 and the circular groove 115 may prevent movement of the first crossing cylinder 120 and the first main cylinder 110 relative to each other. The first main piston 111 is formed with a cross-section which in a plane parallel to the first axis A1 is substantially L-shaped, as seen in FIG. 3A.

Figure 3C:
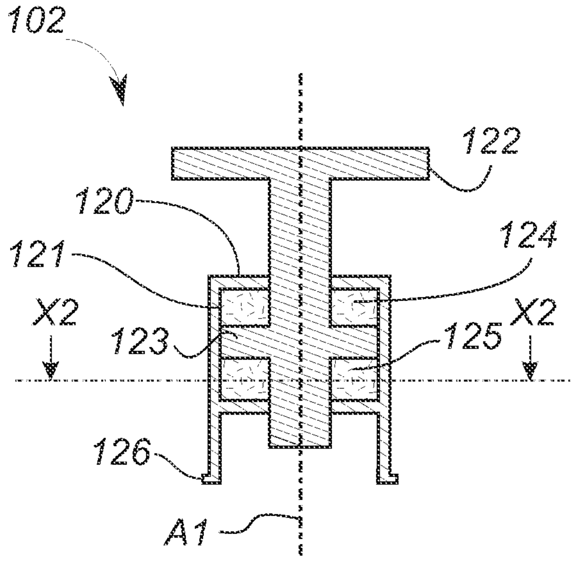
FIG. 3C depicts a schematic cross-sectional top view of the first crossing cylinder of the hydraulic system of FIG. 2.
Figure 3D:
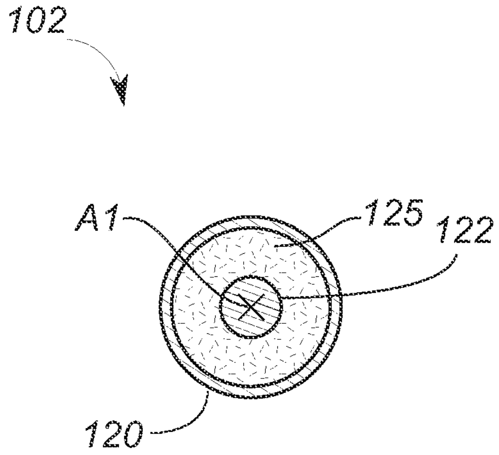
FIG. 3D depicts a schematic cross-sectional view along a section taken along the line X2-X2 of FIG. 3C.

Reference is now made to FIGS. 3C and 3D, where FIG. 3C depicts a schematic cross-sectional view of the first crossing actuator 102, and FIG. 3D depicts a cross-sectional view of the first crossing actuator 102 taken along the line X2-X2 (See FIG. 3C). The following described in relation to the first crossing actuator 102 is equally applicable to a second crossing actuator 104. The first crossing actuator 102 comprises a first crossing cylinder 120 which has a first synchronizing hydraulic chamber 121. The first crossing actuator 102 further comprises a first synchronizing piston 122. The first synchronizing piston 122 further comprises a first synchronizing piston element 123. The first synchronizing piston element 123 is formed as a protrusion on the first synchronizing piston 122. Alternatively, the first synchronizing piston element 123 may be provided as a seal or similar. The first synchronizing piston element 123 is configured to move together with the first synchronizing piston 122 along a first axis A1. The first synchronizing piston element 123 separates the first synchronizing hydraulic chamber 121 into a first compression chamber 124 and a first rebound chamber 125. When the first synchronizing piston element 123 moves together with the first synchronizing piston 122 along the first axis A1, the volume of the first compression chamber 124 and the first rebound chamber 125 changes accordingly. The first synchronizing piston 122 is substantially circular when seen from the bearing housing, as shown on FIG. 3D. The first synchronizing hydraulic chamber 121 has a substantially circular cross-section in a plane perpendicular to the first axis A1. The first synchronizing hydraulic chamber 121 is provided with a protrusion 126. The protrusion 126 is formed as a circular flange extending around a circumference of the first crossing cylinder 120. The protrusion 126 is configured to act as a male connector which may engage a corresponding female connector on the first main cylinder 110.

FIGS. 4 and 5A to 5D illustrate a hydraulic system 200 according to another example embodiment of the first aspect. The hydraulic system 200 is also suitable for use on a roller crusher according to the second aspect. There are many similarities between the hydraulic system 200 and previously described hydraulic system 100, and therefore the hydraulic system 200 will only be briefly described with focus on the differences. Like reference numbers denote like features in the drawings.

Figure 4:
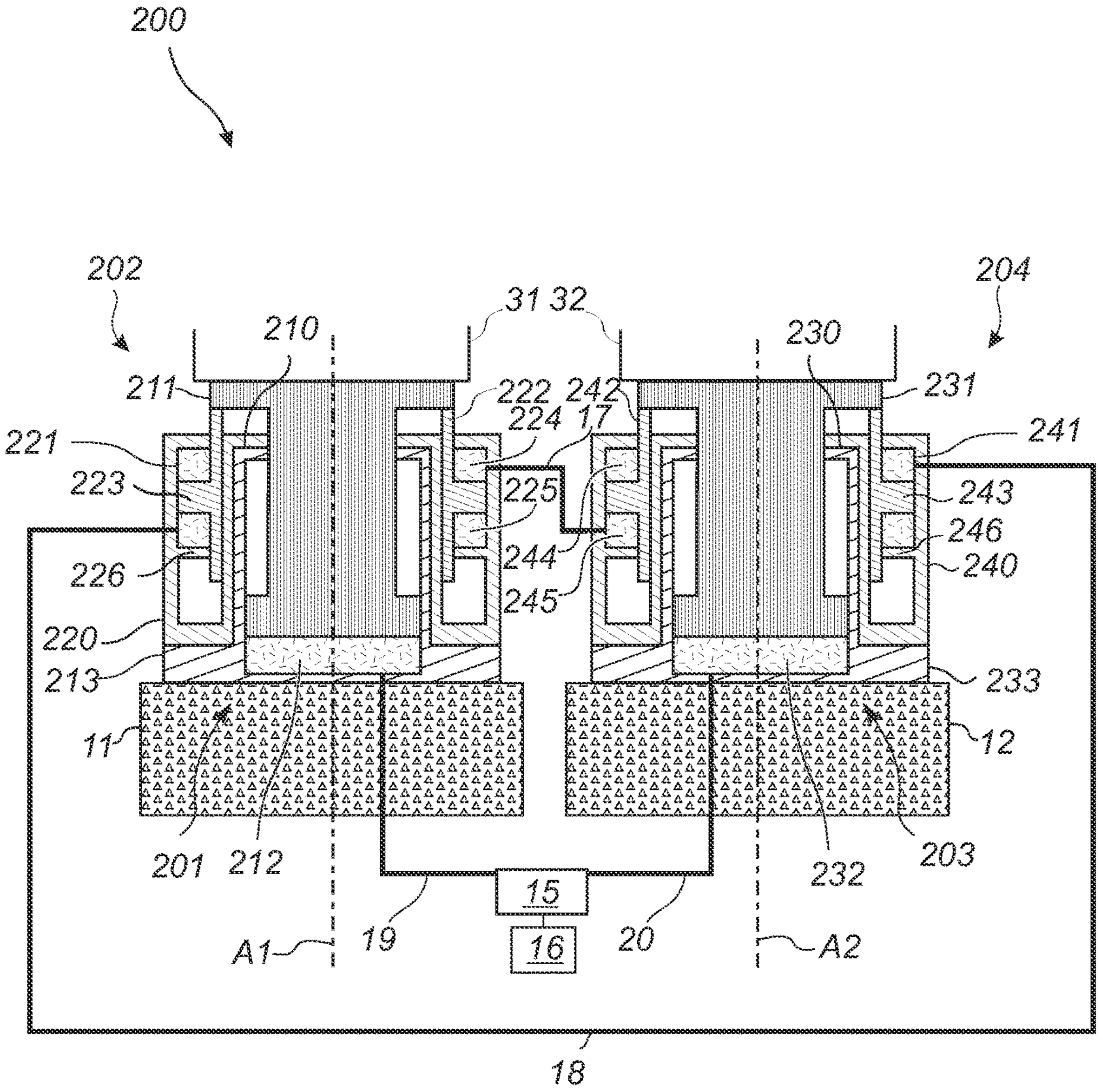
FIG. 4 depicts a schematic cross-sectional top view of another embodiment of a hydraulic system according to a first aspect of the invention connected to movable bearing housings of a roller crusher.
Figure 5A:
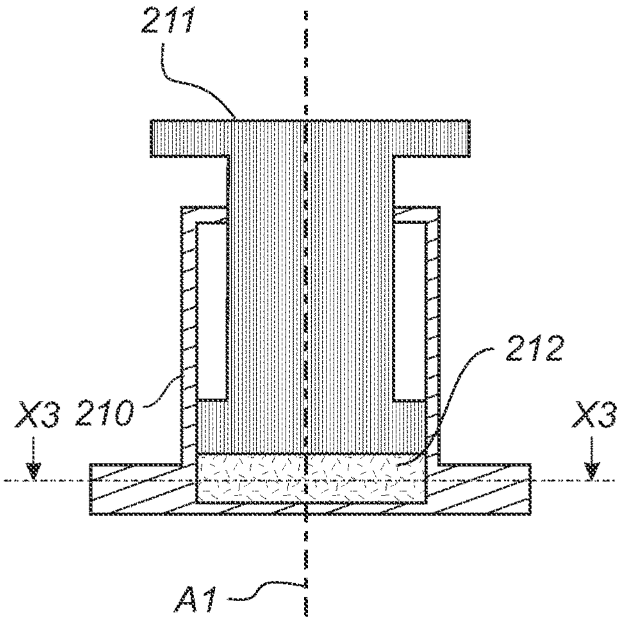
FIG. 5A depicts a schematic cross-sectional top view of the first main cylinder of the hydraulic system of FIG. 4.
Figure 5B:
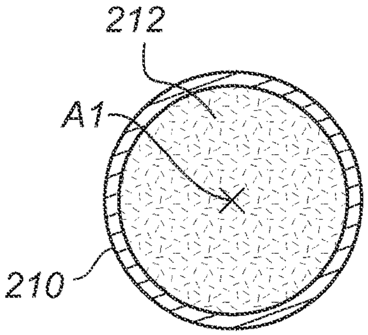
FIG. 5B depicts a schematic cross-sectional view along a section taken along the line X3-X3 of FIG. 5A.
Figure 5C:
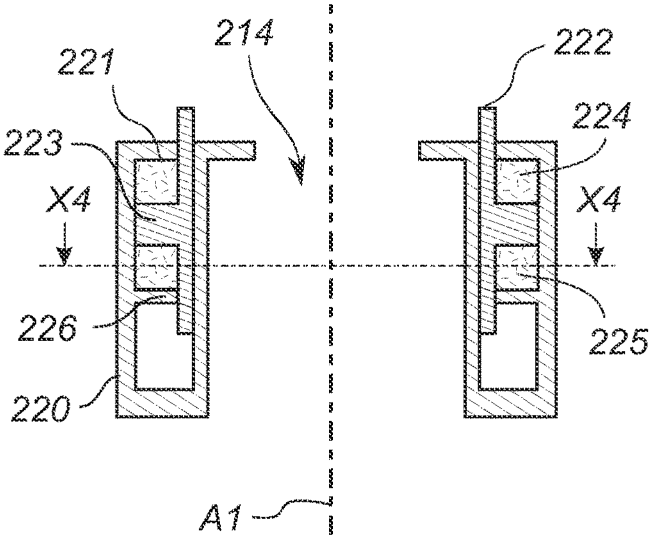
FIG. 5C depicts a schematic cross-sectional top view of the first crossing cylinder of the hydraulic system of FIG. 4.

The hydraulic system 200 comprises a first main actuator 201 and a first crossing actuator 202, and a second main actuator 203 and a second crossing actuator 204. As readily appreciated by the person skilled in the art, the functionality of these main 201, 203 and crossing 202, 204 cylinders are generally the same as for the already described first example embodiment, but there are structural differences. For the hydraulic system 200, the main actuators 201, 203 are arranged in an opposite manner with respect to the crossing actuators 202, 204. In other words, the first crossing actuator 202 is arranged radially outwardly in relation to the first main actuator 201, and the second crossing actuator 204 is arranged radially outwardly in relation to the second main actuator 203. The first main cylinder 210 of the first main actuator 201 has an annular flange 213 which is configured to be attached to a support structure 11 of the roller crusher. Likewise, the second main cylinder 230 of the second main actuator 203 has an annular flange 233 which is configured to be attached to a support structure 12 of the roller crusher. The first 210 and second 230 main cylinders are substantially cylindrically shaped and adapted to be inserted into the first 220 and second 240 crossing cylinders which encloses the same radially outwardly thereof. The first 211 and second 231 main pistons of the main actuators 201, 203 are configured to be attached to the movable bearing housings 31, 32 of the roller crusher 2. As can be seen in FIGS. 4 and 5A to 5D, the main pistons 211, 231 have circular cross sections. The first 212 and second 232 main hydraulic chambers of the main cylinders 210, 230 have circular cross-sectional areas, as best illustrated in FIG. 5B which illustrates the cross-section taken along the line X3-X3 defined in FIG. 5A for the first main hydraulic chamber 212.

Figure 5D:
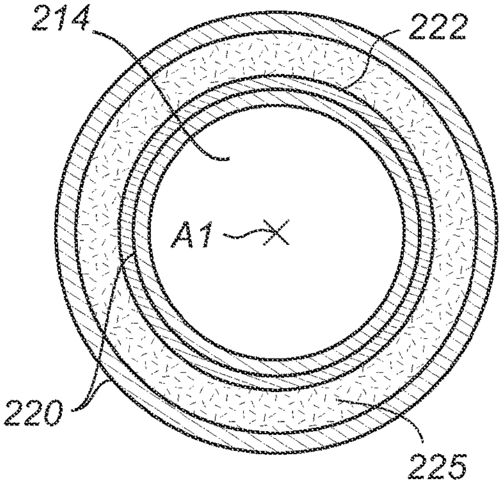
FIG. 5D depicts a schematic cross-sectional view along a section taken along the line X4-X4 of FIG. 5C.

The first 220 and second 240 crossing cylinders extend radially outwardly from the main cylinders 210, 230. The first crossing actuator 202 comprises a first synchronizing piston 222 which protrudes into the first crossing cylinder 220. Likewise, the second crossing actuator 204 comprises a second synchronizing piston 242 which protrudes into the second crossing cylinder 240. As best illustrated in FIG. 5D which shows the cross-section taken along the line X4-X4

(sec FIG. 5C), the first crossing cylinder 220 has an annular cross section. Thus, the first crossing cylinder 220 has the shape of a hollow cylinder extending from an inner diameter to an outer diameter thus defining an external opening 214 in the center thereof. The first synchronizing piston 222 comprises a first synchronizing piston element 223 which extends radially outwardly from the surface of the first synchronizing piston 22 in the form of a flange and meets the opposite inner surface of the first synchronizing hydraulic chamber 221 such that the first synchronizing hydraulic chamber 221 is separated into a first compression chamber 224 and a second rebound chamber 225. Likewise, the second synchronizing piston 242 comprises a second synchronizing piston element 243 which extends radially outwardly from the surface of the second synchronizing piston 242 in the form of a flange and meets the opposite inner surface of the second synchronizing hydraulic chamber 241 such that the second synchronizing hydraulic chamber 241 is separated into a second compression chamber 244 and a second rebound chamber 245. The first crossing cylinder 220 further comprises a first crossing cylinder element 226 which protrudes radially inwardly from an inner surface of the first crossing cylinder 220 such that it meets, in a sealing engagement, the first synchronizing piston 222. As can be seen in FIG. 4, the first crossing cylinder element 226 aids to define the extension of the first synchronizing hydraulic chamber 221, and more particularly the extension of the first rebound chamber 225. Likewise, the second crossing cylinder 240 further comprises a second crossing cylinder element 246 which protrudes radially inwardly from an inner surface of the second crossing cylinder 240 such that it meets, in a sealing engagement, the second synchronizing piston 242. As can be seen in FIG. 4, the second crossing cylinder element 246 aids to define the extension of the second synchronizing hydraulic chamber 241, and more particularly the extension of the second rebound chamber 245.

In the same manner as for the already described first example embodiment, the first compression chamber 224 is fluidly connected to the second rebound chamber 245 via a first synchronizing hydraulic line 17. The first rebound chamber 225 is fluidly connected to the second compression chamber 244 via a second synchronizing hydraulic line 18. The fluid connections between the compression chambers 224 and 244 and the rebound chambers 225 and 245 synchronize the movement of the first synchronizing piston 222 and the second synchronizing piston 242 by the same principle described earlier.

FIGS. 6 and 7A to 7D illustrate a hydraulic system 300 according to yet another example embodiment of the first aspect. The hydraulic system 300 is also suitable for use on a roller crusher 2 according to the second aspect. There are many similarities between the hydraulic system 300 and the previously described hydraulic systems 100 and 200, and therefore the hydraulic system 300 will only be briefly described with focus on the differences. Like reference numbers denote like features in the drawings.

Figure 6:
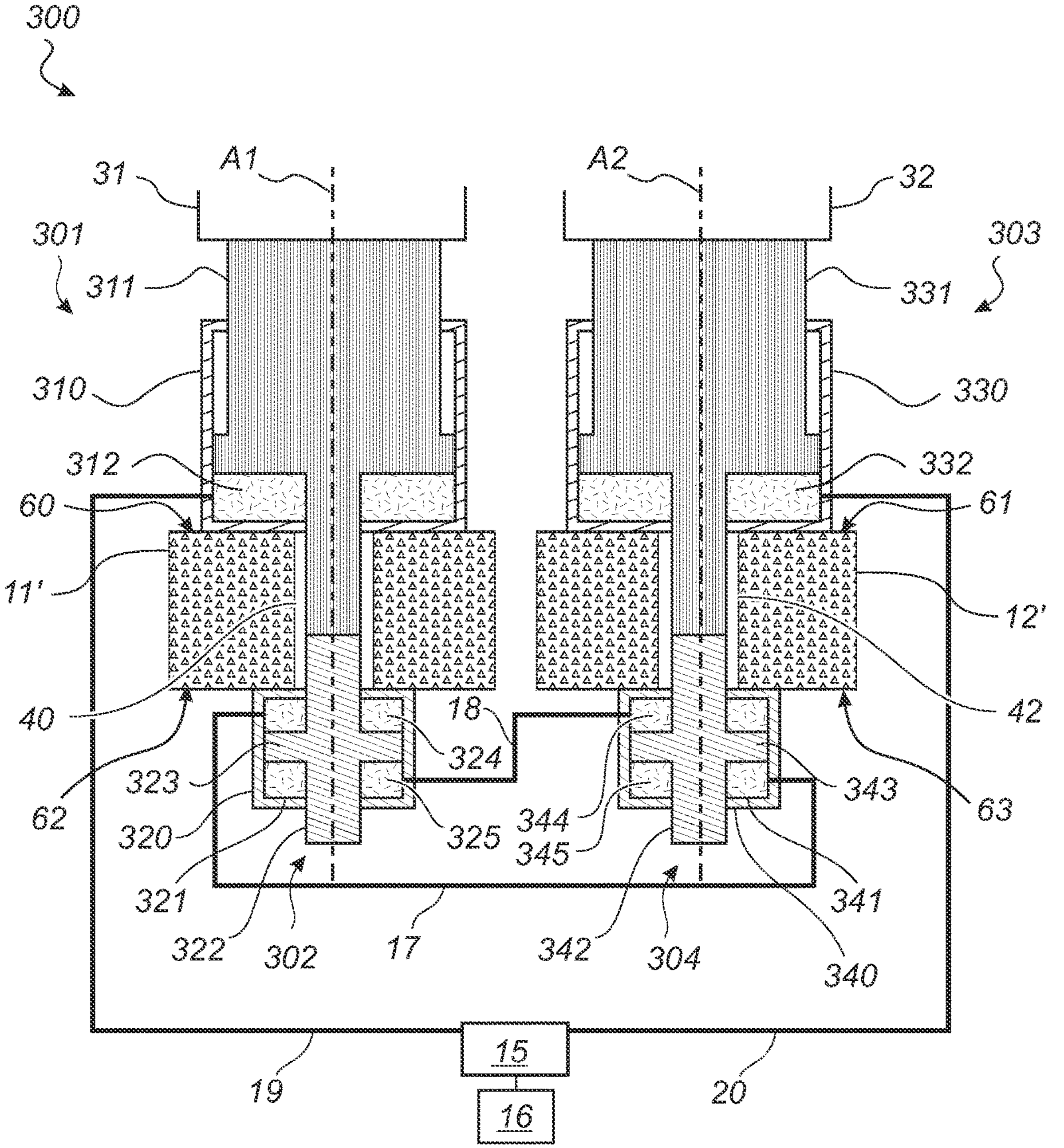
FIG. 6 depicts a schematic cross-sectional top view of yet another embodiment of a hydraulic system according to a first aspect of the invention connected to movable bearing housings of a roller crusher.

The hydraulic system 300 comprises a first main actuator 301 and a first crossing actuator 302, and a second main actuator 303 and a second crossing actuator 304. As readily appreciated by the person skilled in the art, the functionality of these main 301, 303 and crossing 302, 304 actuators are generally the same as for the already described first and second example embodiments, but there are structural differences. For the hydraulic system 300, the main actuators 301, 303 are not arranged radially outwardly with respect to each other as for the previously described example embodiment. Instead, the first main crossing actuator 301 is arranged axially with the first crossing actuator 302 along the first axis A1, and the second main actuator 303 is arranged axially with the second crossing actuator 304 along the second axis A2. As illustrated in FIG. 6, the main 301, 303 and crossing 302, 304 actuators are disposed on opposite sides of a support structure 11', 12' of the roller crusher 2. In other words, the machine frame 21 may comprise a support structure 11', 12' for the hydraulic system 300, said support structure 11', 12' having a first side 60, 61 which faces the movable roller 22 and a second, opposite, side 62, 63 facing away from the movable roller 22.

Figure 7A:
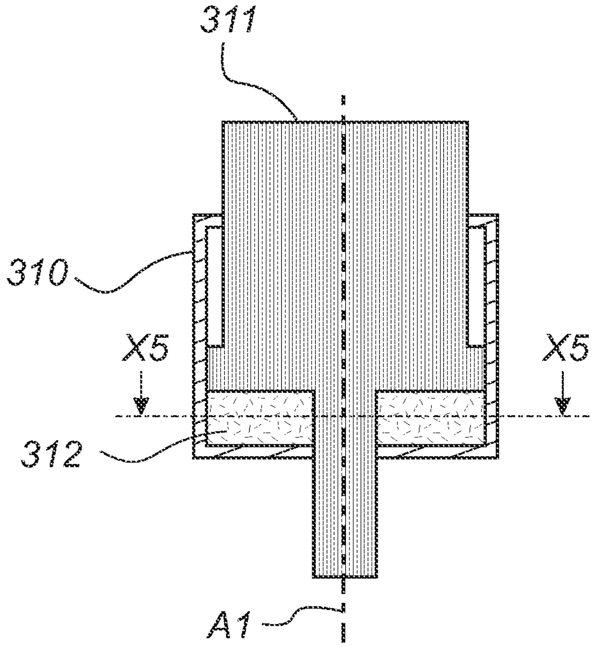
FIG. 7A depicts a schematic cross-sectional top view of the first main cylinder of the hydraulic system of FIG. 6.
Figure 7B:
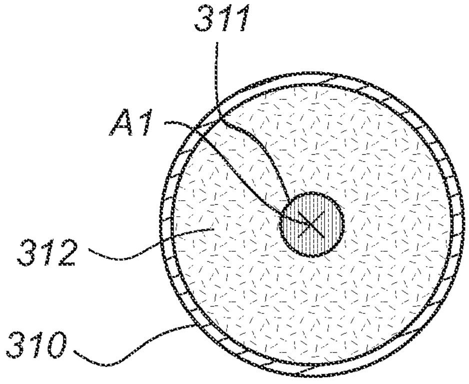
FIG. 7B depicts a schematic cross-sectional view along a section taken along the line X5-X5 of FIG. 7A.
Figure 7C:
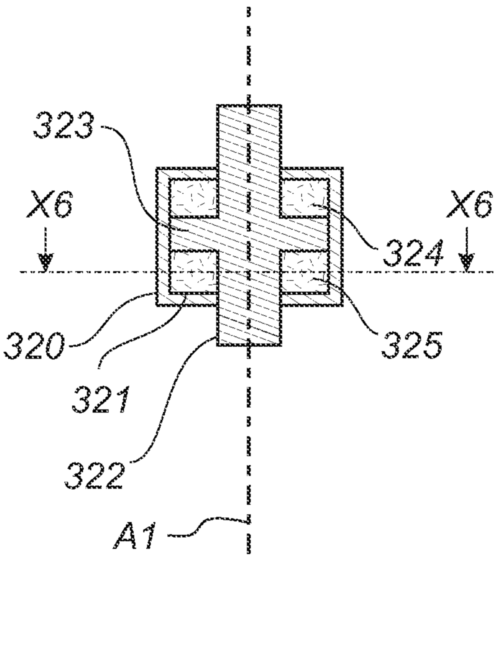
FIG. 7C depicts a schematic cross-sectional top view of the first crossing cylinder of the hydraulic system of FIG. 6.
Figure 7D:
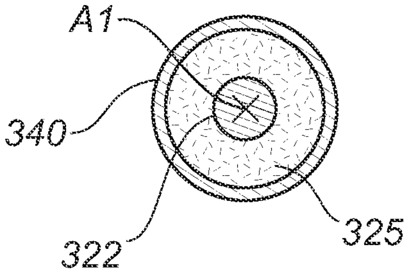
FIG. 7D depicts a schematic cross-sectional view along a section taken along the line X6-X6 of FIG. 7C.

The first main cylinder 310 of the first main actuator 301 is arranged on the first side 60 of the support structure 11' and the first crossing cylinder 320 of the first crossing actuator 302 is arranged on the second side 32 of the support structure 11'. The first main piston 311 of the first actuator 301 and the first synchronizing piston 322 of the first crossing actuator 302 interconnect with each other via a first opening 40 of the support structure 11'. The main piston 311 is configured to be coupled to the movable bearing housing 31 and has a circular cross section. The first main cylinder 310 has a first main hydraulic chamber 312 which has an annular cross section, as illustrated in FIG. 7B which illustrates the cross-section taken along the line X5-X5 (see FIG. 7A). The first crossing cylinder 320 has a first synchronizing hydraulic chamber 321 formed therein. The first synchronizing hydraulic chamber 321 is defined by the inner walls of the first crossing cylinder 320 and the outer surface of the first synchronizing piston 322 which, as can be seen in FIG. 6, extends through the first crossing cylinder 320 such that it protrudes out from the same on opposite sides thereof. The first synchronizing piston 322 comprises a first synchronizing piston element 323 which separates the first synchronizing hydraulic chamber 321 into a first compression chamber 324 and a first rebound chamber 325. The first main piston 311 and the first synchronizing piston 322 are coupled together along the first axis A1. This may be achieved in different ways, such as by bolting, screwing or the like. It is also conceivable that the first main piston 311 and the first synchronizing piston 322 are attached to each other to form an integral one-piece element. This may be achieved by welding or by manufacturing the first main piston 311 and the first synchronizing piston 322 as a one-piece element. The opening 40 may be a through-hole or through-opening, and for such example embodiments, the first main piston 311 and the first synchronizing piston 322 may need to be separate elements which are subsequently attached to each other during assembly. However, in another not illustrated embodiment of the opening 40, the opening is a recess formed in the support structure 11', from a direction being transverse to the first axis A1, which recess allows inserting the first main piston 311 and the first synchronizing piston 322 into the correct position also for embodiments where the first main piston 311 and the first synchronizing piston 322 are pre-joined together.

Likewise, the second main cylinder 330 of the second main actuator 303 is arranged on the first side 61 of the support structure 12' and the second crossing cylinder 340 of the second crossing actuator 304 is arranged on the second side 33 of the support structure 12'. The second main piston 331 of the second actuator 303 and the second synchronizing piston 342 of the second crossing actuator 304 interconnect with each other via a second opening 42 of the support structure 12'. The second main piston 331 is configured to be coupled to the movable bearing housing 32 and has a circular cross section. The second main cylinder 330 has a second main hydraulic chamber 332 which has an annular cross section. The second crossing cylinder 340 has a second synchronizing hydraulic chamber 341 formed therein. The second synchronizing hydraulic chamber 341 is defined by the inner walls of the second crossing cylinder 340 and the outer surface of the second synchronizing piston 342 which, as can be seen in FIG. 6, extends through the second crossing cylinder 340 such that it protrudes out from the same on opposite sides thereof. The second synchronizing hydraulic chamber 341 comprises a second synchronizing piston element 343 which separates the second synchronizing hydraulic chamber 341 into a second compression chamber 344 and a second rebound chamber 345. The second main piston 331 and the second synchronizing piston 342 are coupled together along the second axis A2. This may be achieved in different ways, such as by bolting, screwing or the like. It is also conceivable that the second main piston 331 and the second synchronizing piston 342 are attached to each other to form an integral one-piece element. This may be achieved by welding or by manufacturing the second first main piston 331 and the second synchronizing piston 342 as a one-piece element. The opening 42 may be a through-hole or through-opening, and for such example embodiments, the second main piston 331 and the second synchronizing piston 342 may need to be separate elements which are subsequently attached to each other during assembly. However, in another not illustrated embodiment of the opening 42, the opening is a recess which allows inserting the second main piston 331 and the second synchronizing piston 342 into the correct position also for embodiments where the second main piston 331 and the second synchronizing piston 342 are pre-joined together.

In the same manner as for already described first and second example embodiments, the first compression chamber 324 is fluidly connected to the second rebound chamber 345 via a first synchronizing hydraulic line 17. The first rebound chamber 325 is fluidly connected to the second compression chamber 344 via a second synchronizing hydraulic line 18. The fluid connections between the compression chambers 324 and 344 and the rebound chambers 325 and 345 synchronize the movement of the first synchronizing piston 322 and the second synchronizing piston 342 by the same principle described earlier.

Figure 8:
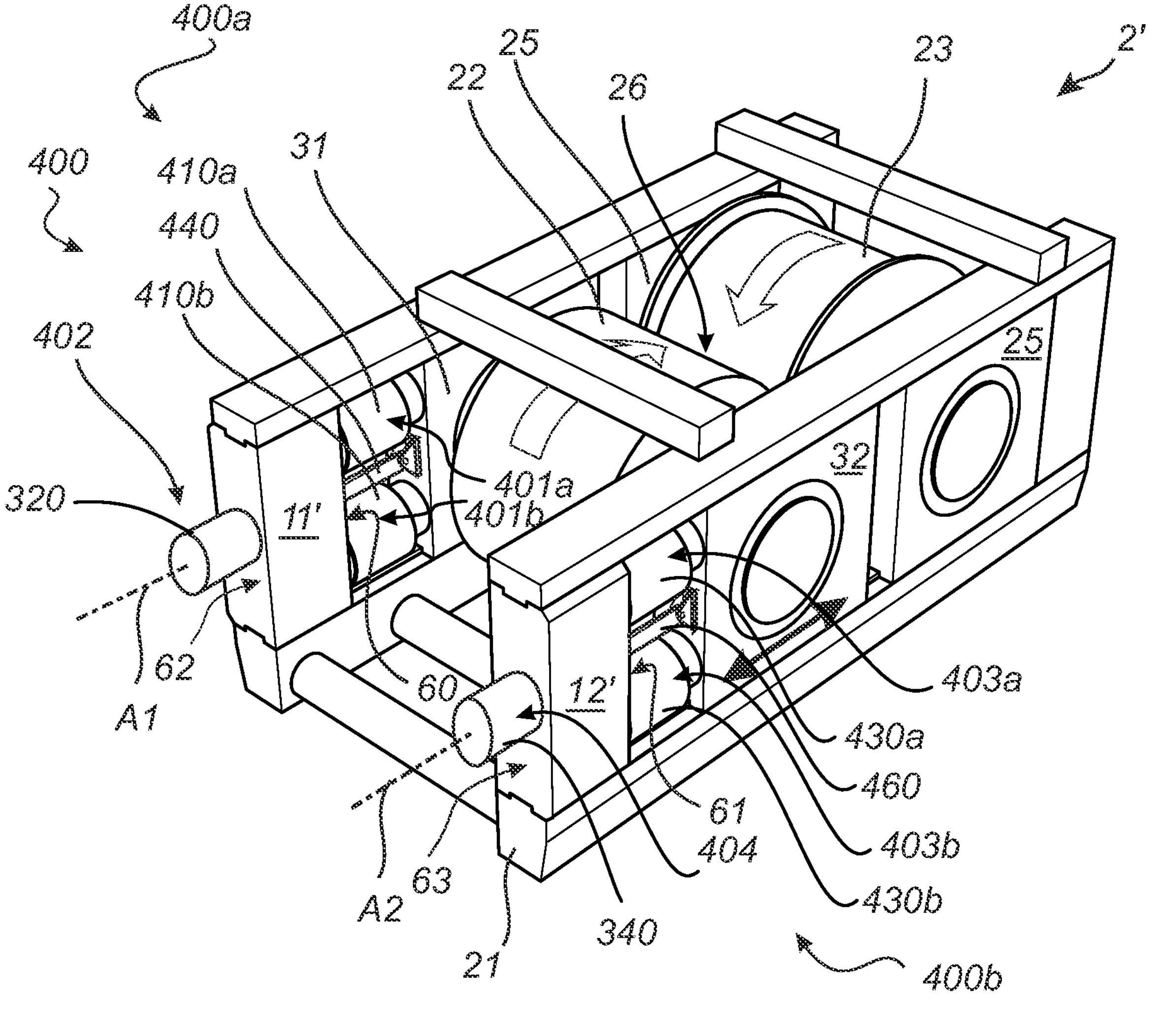
FIG. 8 depicts a perspective schematic view of another embodiment of a roller crusher according to a second aspect of the invention, wherein the roller crusher is equipped with another embodiment of a hydraulic system according to the invention.

As previously mentioned, the hydraulic system according to the disclosure is not limited to the provision of only one main cylinder operating on each movable bearing housing. FIG. 8 illustrates a roller crusher 2' according to an alternative example embodiment of the second aspect, where the roller crusher 2' has been equipped with a hydraulic system 400 based on the provision of two first main actuators 401*a*, 401*b* for the movable bearing housing 31 and two second main actuators 403*a*, 403*b* for the movable bearing housing 32. The two first main actuators 401*a*, 401*b* are disposed on a first side 400*a* of the hydraulic system 400 and the two second main actuators 403*a*, 403*b* are disposed on a second side 400*b* of the hydraulic system 400. As can be seen in FIG. 8, the two first main actuators 401*a*, 401*b* are arranged in parallel with and vertically offset from each other at the first movable bearing housing 31, and the two second main actuators 403*a*, 403*b* are arranged in parallel with and vertically offset from each other at the second movable bearing housing 32. The first crossing actuator 402 is connectable to the first movable bearing housing 31 and arranged in parallel with and between the two first main actuators 401*a*, 401*b*, and the second crossing actuator 404 is connectable to the second movable bearing housing 32 and arranged in parallel with and between the two second main actuators 403*a*, 403*b*.

The hydraulic system 400 may be advantageous as it allows physically separating the main actuators 401*a*, 401*b*, 403*a*, 403*b* and the crossing actuators 402, 404 from each other while still maintaining an even load distribution on the movable bearing housing 31, 32. Discussing only the first side 400*a* of the hydraulic system 400 for increased clarity, by arranging the first main actuators 401*a*, 401*b* parallel with and vertically offset from each other at the first 31 movable bearing housing, and by controlling each of the two first main actuators 401*a*, 401*b* so that they exert a force of the same or substantially the same magnitude onto the movable bearing housing 31, the resulting force on the movable bearing housing 31 will be located between the two first main actuators 401*a*, 401*b*. By arranging the first crossing actuator 402 at that same position, the first main actuators 401*a*, 401*b* and the crossing actuator 402 may operationally couple to each other using an even force distribution even if they are not physically arranged linearly along the first axis A1. The same arguments apply for the second side 400*b* of the hydraulic system 400.

Figure 9:
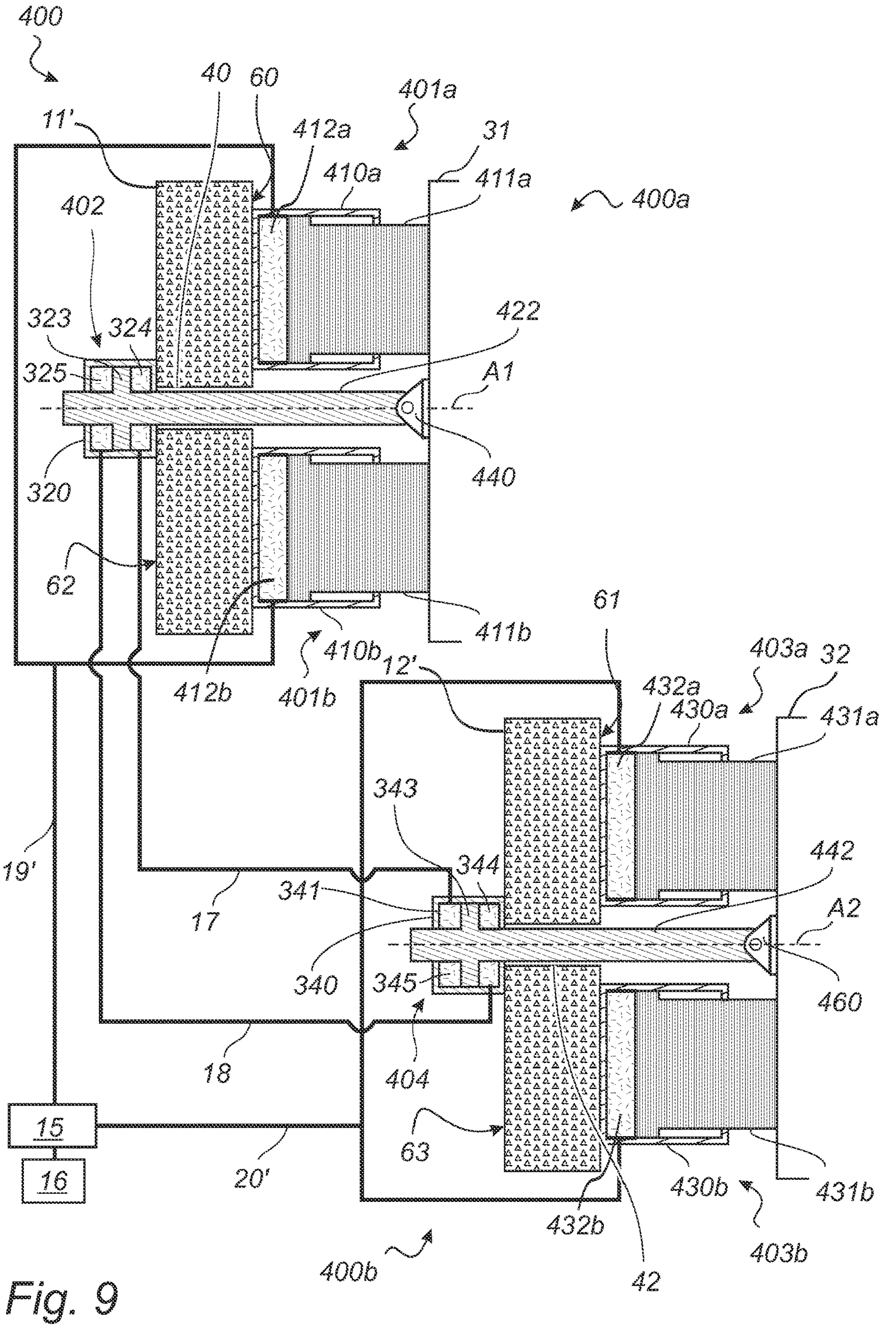
FIG. 9 depicts a schematic cross-sectional side view the hydraulic system of FIG. 8 connected to movable bearing housings of the roller crusher of FIG. 8.

As can be seen in FIG. 8, the first main cylinders 410*a*, 410*b* of the two first main actuators 401*a*, 401*b* are arranged on the first side 60 of support structure 11' and the first crossing cylinder 320 of the first crossing actuator 402 is arranged on the second side 62 of the support structure 11'. On the other side 400*b*, the second main cylinders 430*a*, 430*b* of the two second main actuators 403*a*, 403*b* are arranged on the first side 61 of the support structure 12' and the second crossing cylinder 340 of the second crossing actuator 404 is arranged on the second side 63 of the support structure 12'. The support structures 11' and 12' are the same as the ones described with reference to FIG. 6 and therefore has the same reference numbers in FIG. 8. Also, the first 320 and second 340 crossing cylinders are the same as the ones described with reference to FIG. 6 and therefore has the same reference numbers in FIG. 8. As can be seen in FIG. 8, and even more clearly in FIG. 9 which illustrates the hydraulic system 400 in more detail, the first synchronizing piston 422 is connectable to the first movable bearing housing 31 via the first opening 40 of the support structure 11'. On the second side 400*b*, the second synchronizing piston 442 is connectable to the second movable bearing housing 32 via the second opening 42 of the support structure 12'. The first synchronizing piston 422 is connectable to the first movable bearing housing 11' by means of a first bracket 440, and the second synchronizing piston 442 is connectable to the second movable bearing housing 32 by means of a second bracket 460.

The first synchronizing piston 422 is similar to the previously described first synchronizing piston 322 but differs in that it extends all the way to the first bracket 440 and connects thereto. Similarly, the second synchronizing piston 442 is similar to the previously described first synchronizing piston 342 but differs in that it extends all the way to the second bracket 460 and connects thereto.

The first main actuators 401*a* and 401*b* are in this example embodiment identical to each other. Providing identical main actuators may be beneficial since it facilitates provision of a uniform force distribution. However, it is also conceivable to provide main actuators which are different. Each first main actuator 401*a*, 401*b* comprises a respective first main cylinder 410*a*, 410*b* and a respective first main piston 411*a*, 411*b* which extends into the respective first main cylinder 410*a*, 410*b* to define a respective first main hydraulic chamber 412*a*, 412*b*. Similarly, the second main actuators 403*a* and 403*b* are in this example embodiment identical to each other. Each second main actuator 403*a*, 403*b* comprises a respective second main cylinder 430*a*, 430*b* and a respective first main piston 431*a*, 431*b* which extends into the respective second main cylinder 430*a*, 430*b* to define a respective second main hydraulic chamber 432*a*, 432*b*. As clearly illustrated in FIG. 8, the fluid and the fluid pressure within the first main hydraulic chambers 412*a*, 412*b* and the second main hydraulic chambers 432*a*, 432*b* are controllable via a first hydraulic line 19' and second hydraulic line 20', respectively. The first hydraulic line 19' fluidly connects the first main hydraulic chambers 412*a*, 412*b* to the controller 15, and the second hydraulic line 20' fluidly connects the second main hydraulic chambers 432*a*, 432*b* to the controller 15. The controller 15 may control the fluid and the fluid pressure within the first main hydraulic chambers 412*a*, 412*b* and the second main hydraulic chambers 432*a*, 432*b* in the same manner as for previously described embodiments.

As previously mentioned, the first 320 and second 340 crossing cylinders are the same as for already described hydraulic system 300. Thus, in the same manner as for that example embodiment, the first compression chamber 324 is fluidly connected to the second rebound chamber 345 via a first synchronizing hydraulic line 17. The first rebound chamber 325 is fluidly connected to the second compression chamber 344 via a second synchronizing hydraulic line 18. The fluid connections between the compression chambers 324 and 344 and the rebound chambers 325 and 345 synchronize the movement of the first synchronizing piston 422 and the second synchronizing piston 442 by the same principle described earlier.

Although some embodiments have been described and shown in detail, the invention is not restricted to them, but may also be embodied in other ways within the scope of the subject matter defined in the following claims. In particular, it is to be understood that other embodiments may be utilized, and structural and functional modifications may be made without departing from the scope of the present invention.

There are for example numerous ways to operationally couple the crossing actuator to the at least one main actuator. As yet a further example, the crossing actuator may be configured to be arranged between the fixed bearing housing and the movable bearing housing interconnecting the same. As readily appreciated by the person skilled in the art, the same principle will apply as for the other embodiments, because any movement of a movable bearing housing will result in a change in the gap between the fixed bearing housing and the movable bearing housing. If the crossing cylinder is arranged between the fixed bearing housing and the movable bearing housing and interconnects the same, the synchronizing piston will move in relation to the crossing cylinder, which will cause a movement of fluid to the opposite crossing cylinder.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

List of Embodiments

Embodiment 1. A hydraulic system for a roller crusher comprising a machine frame, a fixed roll supported by one or more fixed bearing housings fixed relative to the machine frame, a movable roll supported by first and second movable bearing housings movable relative to the machine frame, and wherein the fixed roll and the movable roll defines a crushing gap for receiving material to be comminuted, the hydraulic system comprising:

at least one first main actuator connectable to the first movable bearing housing, each of the at least one first main actuator comprising a first main cylinder having a first main hydraulic chamber formed therein, and a first main piston which extends into the first main cylinder, wherein the at least one first main actuator is configured to exert a force along a first axis resulting in a force on the first movable bearing housing, at least one second main actuator connectable to the second movable bearing housing, each of the at least one second main actuator comprising a second main cylinder having a second main hydraulic chamber formed therein, and a second main piston which extends into the second main cylinder, wherein the at least one second main actuator is configured to exert a force along a second axis parallel to the first axis resulting in a force on the second movable bearing housing, a first crossing actuator comprising a first crossing cylinder having a first synchronizing hydraulic chamber formed therein, and a first synchronizing piston which extends into the first synchronizing hydraulic chamber, wherein the first synchronizing piston comprises a first synchronizing piston element separating the first synchronizing hydraulic chamber into a first compression chamber and a first rebound chamber, a second crossing actuator comprising a second crossing cylinder having a second synchronizing hydraulic chamber formed therein, and a second synchronizing piston which extends into the second synchronizing hydraulic chamber, wherein the second synchronizing piston comprises a second synchronizing piston element separating the second synchronizing hydraulic chamber into a second compression chamber and a second rebound chamber, wherein the first crossing actuator is operationally coupled to the at least one first main actuator, and the second crossing actuator is operationally coupled to the at least one second main actuator, and wherein the first compression chamber is fluidly connected to the second rebound chamber and the first rebound chamber is fluidly connected to the second compression chamber.

Embodiment 2. A hydraulic system according to Embodiment 1, wherein the first main piston(s) of the at least one first main actuator is configured to deliver the force along the first axis to the first synchronizing piston and/or the second main piston(s) of the at least one second main actuator is configured to deliver the force along the second axis to the second synchronizing piston.

Embodiment 3. The hydraulic system according to Embodiment 1 or 2, wherein the at least one first main actuator is a first main actuator and wherein said first main actuator and the first crossing actuator are coaxially arranged with respect to each other about the first axis, and/or wherein the at least one second main actuator is a second main actuator and wherein said second main actuator and the second crossing actuator are coaxially arranged with respect to each other about the second axis.

Embodiment 4. The hydraulic system according to Embodiment 3, wherein the first main actuator is arranged radially outwardly in relation to the first crossing actuator, and/or wherein the second main actuator is arranged radially outwardly in relation to the second crossing actuator.

Embodiment 5. The hydraulic system according to Embodiment 4, wherein the first main cylinder has an annular cross section and the first crossing cylinder has a circular cross section, and/or wherein the second main cylinder has an annular cross section and the second crossing cylinder has a circular cross section.

Embodiment 6. The hydraulic system according to Embodiment 3, wherein the first crossing actuator is arranged radially outwardly in relation to the first main actuator, and/or wherein the second crossing actuator is arranged radially outwardly in relation to the second main actuator.

Embodiment 7. The hydraulic system according to Embodiment 6, wherein the first main cylinder has a circular cross section and the first crossing cylinder has an annular cross section, wherein the second main cylinder has a circular cross section and the second crossing cylinder has an annular cross section.

Embodiment 8. The hydraulic system according to Embodiment 1 or 2, wherein the at least one first main actuator is a first main actuator, said first main actuator being arranged axially with the first crossing actuator, one after the other, along the first axis, and wherein the at least one second main actuator is a second main actuator, said second main actuator being arranged axially with the second crossing actuator, one after the other, along the second axis.

Embodiment 9. The hydraulic system according to Embodiment 8, wherein the machine frame comprises a support structure for the hydraulic system, said support structure having a first side which faces the movable roll and a second, opposite, side facing away from the movable roll, wherein the first main cylinder is configured to be arranged on the first side of the support structure and the first crossing cylinder is configured to be arranged on the second side of the support structure, and wherein the first main piston and the first synchronizing piston are configured to interconnect with each other via a first opening of the support structure, and wherein the second main cylinder is configured to be arranged on the first side of the support structure and the second crossing cylinder is configured to be arranged on the second side of the support structure, and wherein the second main piston and the second synchronizing piston are configured to interconnect with each other via a second opening of the support structure.

Embodiment 10. The hydraulic system according to Embodiment 1 or 2, wherein the at least one first main actuator comprises two first main actuators which are configured to be arranged in parallel with and vertically offset from each other at the first movable bearing housing, wherein the at least one second main actuator comprises two second main actuators which are configured to be arranged in parallel with and vertically offset from each other at the second movable bearing housing, wherein the first crossing actuator is connectable to the first movable bearing housing and configured to be arranged in parallel with and between the two first main actuators, and wherein the second crossing actuator is connectable to the second movable bearing housing and configured to be arranged in parallel with and between the two second main actuators.

Embodiment 11. The hydraulic system according to Embodiment 10, wherein the machine frame comprises a support structure for the hydraulic system, said support structure having a first side which faces the movable roll and a second, opposite, side facing away from the movable roll, wherein the first main cylinders of the two first main actuators are configured to be arranged on the first side of the support structure and the first crossing cylinder is configured to be arranged on the second side of the support structure, and wherein the first synchronizing piston is connectable to the first movable bearing housing via a first opening of the support structure, and wherein the second main cylinders of the two second main actuators are configured to be arranged on the first side of the support structure and the second crossing cylinder is configured to be arranged on the second side of the support structure, and wherein the second synchronizing piston is connectable to the second movable bearing housing via a second opening of the support structure.

Embodiment 12. The hydraulic system according to Embodiment 10 or 11, wherein the first synchronizing piston is connectable to the first movable bearing housing by means of a first bracket, and wherein the second synchronizing piston is connectable to the second movable bearing housing by means of a second bracket.

Embodiment 13. The hydraulic system according to any one of the preceding Embodiments, wherein a total cross-sectional area of the first main hydraulic chamber(s) of the at least one first main actuator is 1.5 to 9 times larger than a cross-sectional area of the first synchronizing chamber, and wherein a total cross-sectional area of the second main hydraulic chamber(s) of the at least one second main actuator is 1.5 to 9 times larger than a cross-sectional area of the second synchronizing chamber.

Embodiment 14. The hydraulic system according to any one of the preceding Embodiments, wherein the fluid connection between the first compression chamber and the second rebound chamber forms a first closed fluid circuit and the fluid connection between the first rebound chamber and the second compression chamber forms a second closed fluid circuit.

Embodiment 15. The hydraulic system according to any one of the preceding Embodiments, further comprising one or more hydraulic accumulators in fluid connection with the first main hydraulic chamber of each of the at least one first main actuator and/or the second main hydraulic chamber of each of the at least one second main actuator.

Embodiment 16. The hydraulic system according to any one of the preceding Embodiments, wherein the first synchronizing piston and the first synchronizing piston element are integrally connected, and the second synchronizing piston and the second synchronizing piston element are integrally connected.

Embodiment 17. The hydraulic system according to any one of Embodiments 3 to 7, wherein the first crossing cylinder is engaged with the first main cylinder to prevent movement of the first crossing cylinder relative to the first main cylinder in a first plane perpendicular to the first axis, and/or the second crossing cylinder is engaged with the second main cylinder to prevent movement of the second crossing cylinder relative to the second main cylinder in in a second plane perpendicular to the second axis.

Embodiment 18. The hydraulic system according to any one of Embodiments 3 to 9, wherein the first main piston is connected with the first synchronizing piston and/or the second main piston is connected with the second synchronizing piston.

Embodiment 19. The hydraulic system according to Embodiment 18, wherein the first main piston is integrally connected with the first synchronizing piston and/or the second main piston is integrally connected with the second synchronizing piston.

Embodiment 20. The hydraulic system according to any one of Embodiments 3 to 9, wherein the first main cylinder and the first crossing cylinder are integrally formed as a first one-piece element and/or the second main cylinder and the second crossing cylinder are integrally formed as a second one-piece element.

Embodiment 21. A roller crusher for comminution of material comprising:

a machine frame, a fixed roll supported by fixed bearing housings, wherein the fixed bearing housings are fixed relative to the machine frame, a movable roll supported by movable bearing housings, wherein the movable bearing housings are movable relative to the machine frame, wherein the fixed roll and the movable roll defines a crushing gap for receiving material to be comminuted, and a hydraulic system according to any one of Embodiments 1-20, wherein the hydraulic system is configured to deliver a force onto the movable bearing housing to bias the movable roll towards the fixed roll.

The invention claimed is:

1. A hydraulic system for a roller crusher comprising a machine frame, a fixed roll supported by one or more fixed bearing housings fixed relative to the machine frame, a movable roll supported by first and second movable bearing housings movable relative to the machine frame, and wherein the fixed roll and the movable roll defines a crushing gap for receiving material to be comminuted, the hydraulic system comprising:

at least one first main actuator connectable to the first movable bearing housing, each of the at least one first main actuator comprising a first main cylinder having a first main hydraulic chamber formed therein, and a first main piston which extends into the first main cylinder, wherein the at least one first main actuator is configured to exert a force along a first axis resulting in a force on the first movable bearing housing, at least one second main actuator connectable to the second movable bearing housing, each of the at least one second main actuator comprising a second main cylinder having a second main hydraulic chamber formed therein, and a second main piston which extends into the second main cylinder, wherein the at least one second main actuator is configured to exert a force along a second axis parallel to the first axis resulting in a force on the second movable bearing housing, a first crossing actuator comprising a first crossing cylinder having a first synchronizing hydraulic chamber formed therein, and a first synchronizing piston which extends into the first synchronizing hydraulic chamber, wherein the first synchronizing piston comprises a first synchronizing piston element separating the first synchronizing hydraulic chamber into a first compression chamber and a first rebound chamber, a second crossing actuator comprising a second crossing cylinder having a second synchronizing hydraulic chamber formed therein, and a second synchronizing piston which extends into the second synchronizing hydraulic chamber, wherein the second synchronizing piston comprises a second synchronizing piston element separating the second synchronizing hydraulic chamber into a second compression chamber and a second rebound chamber, wherein the first crossing actuator is operationally coupled to the at least one first main actuator, and the second crossing actuator is operationally coupled to the at least one second main actuator, wherein the first compression chamber is fluidly connected to the second rebound chamber and the first rebound chamber is fluidly connected to the second compression chamber, and wherein a total cross-sectional area of the first main hydraulic chamber(s) of the at least one first main actuator is 1.5 to 9 times larger than a cross-sectional area of the first synchronizing chamber, and wherein a total cross-sectional area of the second main hydraulic chamber(s) of the at least one second main actuator is 1.5 to 9 times larger than a cross-sectional area of the second synchronizing chamber.

2. A hydraulic system according to claim 1, wherein the first main piston(s) of the at least one first main actuator is configured to deliver the force along the first axis to the first synchronizing piston and/or the second main piston(s) of the at least one second main actuator is configured to deliver the force along the second axis to the second synchronizing piston.

3. The hydraulic system according to claim 1, wherein the at least one first main actuator is a first main actuator and wherein said first main actuator and the first crossing actuator are coaxially arranged with respect to each other about the first axis, and/or wherein the at least one second main actuator is a second main actuator and wherein said second main actuator and the second crossing actuator are coaxially arranged with respect to each other about the second axis.

4. The hydraulic system according claim 3, wherein the first crossing cylinder is engaged with the first main cylinder to prevent movement of the first crossing cylinder relative to the first main cylinder in a first plane perpendicular to the first axis, and/or the second crossing cylinder is engaged with the second main cylinder to prevent movement of the second crossing cylinder relative to the second main cylinder in in a second plane perpendicular to the second axis.

5. The hydraulic system according to claim 3, wherein the first main piston is connected with the first synchronizing piston and/or the second main piston is connected with the second synchronizing piston.

6. The hydraulic system according to claim 5, wherein the first main piston is integrally connected with the first synchronizing piston and/or the second main piston is integrally connected with the second synchronizing piston.

7. The hydraulic system according to claim 3, wherein the first main cylinder and the first crossing cylinder are integrally formed as a first one-piece element and/or the second main cylinder and the second crossing cylinder are integrally formed as a second one-piece element.

8. The hydraulic system according to claim 1, wherein the at least one first main actuator is a first main actuator, said first main actuator being arranged axially with the first crossing actuator, one after the other, along the first axis, and wherein the at least one second main actuator is a second main actuator, said second main actuator being arranged axially with the second crossing actuator, one after the other, along the second axis.

9. The hydraulic system according to claim 1, wherein the fluid connection between the first compression chamber and the second rebound chamber forms a first closed fluid circuit and the fluid connection between the first rebound chamber and the second compression chamber forms a second closed fluid circuit.

10. The hydraulic system according to claim 1, further comprising one or more hydraulic accumulators in fluid connection with the first main hydraulic chamber of each of the at least one first main actuator and/or the second main hydraulic chamber of each of the at least one second main actuator.

11. The hydraulic system according claim 1, wherein the first synchronizing piston and the first synchronizing piston element are integrally connected, and the second synchronizing piston and the second synchronizing piston element are integrally connected.

12. A roller crusher for comminution of material comprising:

a machine frame, a fixed roll supported by fixed bearing housings, wherein the fixed bearing housings are fixed relative to the machine frame, a movable roll supported by movable bearing housings, wherein the movable bearing housings are movable relative to the machine frame, wherein the fixed roll and the movable roll defines a crushing gap for receiving material to be comminuted, and a hydraulic system according to claim 1, wherein the hydraulic system is configured to deliver a force onto the movable bearing housing to bias the movable roll towards the fixed roll.

13. A hydraulic system for a roller crusher comprising a machine frame, a fixed roll supported by one or more fixed bearing housings fixed relative to the machine frame, a movable roll supported by first and second movable bearing housings movable relative to the machine frame, and wherein the fixed roll and the movable roll defines a crushing gap for receiving material to be comminuted, the hydraulic system comprising:

at least one first main actuator connectable to the first movable bearing housing, each of the at least one first main actuator comprising a first main cylinder having a first main hydraulic chamber formed therein, and a first main piston which extends into the first main cylinder, wherein the at least one first main actuator is configured to exert a force along a first axis resulting in a force on the first movable bearing housing, at least one second main actuator connectable to the second movable bearing housing, each of the at least one second main actuator comprising a second main cylinder having a second main hydraulic chamber formed therein, and a second main piston which extends into the second main cylinder, wherein the at least one second main actuator is configured to exert a force along a second axis parallel to the first axis resulting in a force on the second movable bearing housing, a first crossing actuator comprising a first crossing cylinder having a first synchronizing hydraulic chamber formed therein, and a first synchronizing piston which extends into the first synchronizing hydraulic chamber, wherein the first synchronizing piston comprises a first synchronizing piston element separating the first synchronizing hydraulic chamber into a first compression chamber and a first rebound chamber, a second crossing actuator comprising a second crossing cylinder having a second synchronizing hydraulic chamber formed therein, and a second synchronizing piston which extends into the second synchronizing hydraulic chamber, wherein the second synchronizing piston comprises a second synchronizing piston element separating the second synchronizing hydraulic chamber into a second compression chamber and a second rebound chamber, wherein the first crossing actuator is operationally coupled to the at least one first main actuator, and the second crossing actuator is operationally coupled to the at least one second main actuator, wherein the first compression chamber is fluidly connected to the second rebound chamber and the first rebound chamber is fluidly connected to the second compression chamber, wherein the at least one first main actuator is a first main actuator and wherein said first main actuator and the first crossing actuator are coaxially arranged with respect to each other about the first axis, and/or wherein the at least one second main actuator is a second main actuator and wherein said second main actuator and the second crossing actuator are coaxially arranged with respect to each other about the second axis, and wherein the first main actuator is arranged radially outwardly in relation to the first crossing actuator, and/or wherein the second main actuator is arranged radially outwardly in relation to the second crossing actuator.

14. The hydraulic system according to claim 13, wherein the first main cylinder has an annular cross section and the first crossing cylinder has a circular cross section, and/or wherein the second main cylinder has an annular cross section and the second crossing cylinder has a circular cross section.

15. A hydraulic system for a roller crusher comprising a machine frame, a fixed roll supported by one or more fixed bearing housings fixed relative to the machine frame, a movable roll supported by first and second movable bearing housings movable relative to the machine frame, and wherein the fixed roll and the movable roll defines a crushing gap for receiving material to be comminuted, the hydraulic system comprising:

at least one first main actuator connectable to the first movable bearing housing, each of the at least one first main actuator comprising a first main cylinder having a first main hydraulic chamber formed therein, and a first main piston which extends into the first main cylinder, wherein the at least one first main actuator is configured to exert a force along a first axis resulting in a force on the first movable bearing housing, at least one second main actuator connectable to the second movable bearing housing, each of the at least one second main actuator comprising a second main cylinder having a second main hydraulic chamber formed therein, and a second main piston which extends into the second main cylinder, wherein the at least one second main actuator is configured to exert a force along a second axis parallel to the first axis resulting in a force on the second movable bearing housing, a first crossing actuator comprising a first crossing cylinder having a first synchronizing hydraulic chamber formed therein, and a first synchronizing piston which extends into the first synchronizing hydraulic chamber, wherein the first synchronizing piston comprises a first synchronizing piston element separating the first synchronizing hydraulic chamber into a first compression chamber and a first rebound chamber, a second crossing actuator comprising a second crossing cylinder having a second synchronizing hydraulic chamber formed therein, and a second synchronizing piston which extends into the second synchronizing hydraulic chamber, wherein the second synchronizing piston comprises a second synchronizing piston element separating the second synchronizing hydraulic chamber into a second compression chamber and a second rebound chamber, wherein the first crossing actuator is operationally coupled to the at least one first main actuator, and the second crossing actuator is operationally coupled to the at least one second main actuator, wherein the first compression chamber is fluidly connected to the second rebound chamber and the first rebound chamber is fluidly connected to the second compression chamber, wherein the at least one first main actuator is a first main actuator and wherein said first main actuator and the first crossing actuator are coaxially arranged with respect to each other about the first axis, and/or wherein the at least one second main actuator is a second main actuator and wherein said second main actuator and the second crossing actuator are coaxially arranged with respect to each other about the second axis, and wherein the first crossing actuator is arranged radially outwardly in relation to the first main actuator, and/or wherein the second crossing actuator is arranged radially outwardly in relation to the second main actuator.

16. The hydraulic system according to claim 15, wherein the first main cylinder has a circular cross section and the first crossing cylinder has an annular cross section, wherein the second main cylinder has a circular cross section and the second crossing cylinder has an annular cross section.

17. A hydraulic system for a roller crusher comprising a machine frame, a fixed roll supported by one or more fixed bearing housings fixed relative to the machine frame, a movable roll supported by first and second movable bearing housings movable relative to the machine frame, and wherein the fixed roll and the movable roll defines a crushing gap for receiving material to be comminuted, the hydraulic system comprising:

at least one first main actuator connectable to the first movable bearing housing, each of the at least one first main actuator comprising a first main cylinder having a first main hydraulic chamber formed therein, and a first main piston which extends into the first main cylinder, wherein the at least one first main actuator is configured to exert a force along a first axis resulting in a force on the first movable bearing housing, at least one second main actuator connectable to the second movable bearing housing, each of the at least one second main actuator comprising a second main cylinder having a second main hydraulic chamber formed therein, and a second main piston which extends into the second main cylinder, wherein the at least one second main actuator is configured to exert a force along a second axis parallel to the first axis resulting in a force on the second movable bearing housing, a first crossing actuator comprising a first crossing cylinder having a first synchronizing hydraulic chamber formed therein, and a first synchronizing piston which extends into the first synchronizing hydraulic chamber, wherein the first synchronizing piston comprises a first synchronizing piston element separating the first synchronizing hydraulic chamber into a first compression chamber and a first rebound chamber, a second crossing actuator comprising a second crossing cylinder having a second synchronizing hydraulic chamber formed therein, and a second synchronizing piston which extends into the second synchronizing hydraulic chamber, wherein the second synchronizing piston comprises a second synchronizing piston element separating the second synchronizing hydraulic chamber into a second compression chamber and a second rebound chamber, wherein the first crossing actuator is operationally coupled to the at least one first main actuator, and the second crossing actuator is operationally coupled to the at least one second main actuator, wherein the first compression chamber is fluidly connected to the second rebound chamber and the first rebound chamber is fluidly connected to the second compression chamber, wherein the at least one first main actuator is a first main actuator, said first main actuator being arranged axially with the first crossing actuator, one after the other, along the first axis, and wherein the at least one second main actuator is a second main actuator, said second main actuator being arranged axially with the second crossing actuator, one after the other, along the second axis, wherein the machine frame comprises a support structure for the hydraulic system, said support structure having a first side which faces the movable roll and a second, opposite, side facing away from the movable roll, wherein the first main cylinder is configured to be arranged on the first side of the support structure and the first crossing cylinder is configured to be arranged on the second side of the support structure, and wherein the first main piston and the first synchronizing piston are configured to interconnect with each other via a first opening of the support structure, and wherein the second main cylinder is configured to be arranged on the first side of the support structure and the second crossing cylinder is configured to be arranged on the second side of the support structure, and wherein the second main piston and the second synchronizing piston are configured to interconnect with each other via a second opening of the support structure.

18. A hydraulic system for a roller crusher comprising a machine frame, a fixed roll supported by one or more fixed bearing housings fixed relative to the machine frame, a movable roll supported by first and second movable bearing housings movable relative to the machine frame, and wherein the fixed roll and the movable roll defines a crushing gap for receiving material to be comminuted, the hydraulic system comprising:

at least one first main actuator connectable to the first movable bearing housing, each of the at least one first main actuator comprising a first main cylinder having a first main hydraulic chamber formed therein, and a first main piston which extends into the first main cylinder, wherein the at least one first main actuator is configured to exert a force along a first axis resulting in a force on the first movable bearing housing, at least one second main actuator connectable to the second movable bearing housing, each of the at least one second main actuator comprising a second main cylinder having a second main hydraulic chamber formed therein, and a second main piston which extends into the second main cylinder, wherein the at least one second main actuator is configured to exert a force along a second axis parallel to the first axis resulting in a force on the second movable bearing housing, a first crossing actuator comprising a first crossing cylinder having a first synchronizing hydraulic chamber formed therein, and a first synchronizing piston which extends into the first synchronizing hydraulic chamber, wherein the first synchronizing piston comprises a first synchronizing piston element separating the first synchronizing hydraulic chamber into a first compression chamber and a first rebound chamber, a second crossing actuator comprising a second crossing cylinder having a second synchronizing hydraulic chamber formed therein, and a second synchronizing piston which extends into the second synchronizing hydraulic chamber, wherein the second synchronizing piston comprises a second synchronizing piston element separating the second synchronizing hydraulic chamber into a second compression chamber and a second rebound chamber, wherein the first crossing actuator is operationally coupled to the at least one first main actuator, and the second crossing actuator is operationally coupled to the at least one second main actuator, wherein the first compression chamber is fluidly connected to the second rebound chamber and the first rebound chamber is fluidly connected to the second compression chamber, wherein the at least one first main actuator comprises two first main actuators which are configured to be arranged in parallel with and vertically offset from each other at the first movable bearing housing, wherein the at least one second main actuator comprises two second main actuators which are configured to be arranged in parallel with and vertically offset from each other at the second movable bearing housing, wherein the first crossing actuator is connectable to the first movable bearing housing and configured to be arranged in parallel with and between the two first main actuators, and wherein the second crossing actuator is connectable to the second movable bearing housing and configured to be arranged in parallel with and between the two second main actuators.

19. The hydraulic system according to claim 18, wherein the machine frame comprises a support structure for the hydraulic system, said support structure having a first side which faces the movable roll and a second, opposite, side facing away from the movable roll, wherein the first main cylinders of the two first main actuators are configured to be arranged on the first side of the support structure and the first crossing cylinder is configured to be arranged on the second side of the support structure, and wherein the first synchronizing piston is connectable to the first movable bearing housing via a first opening of the support structure, and wherein the second main cylinders of the two second main actuators are configured to be arranged on the first side of the support structure and the second crossing cylinder is configured to be arranged on the second side of the support structure, and wherein the second synchronizing piston is connectable to the second movable bearing housing via a second opening of the support structure.

20. The hydraulic system according to claim 18, wherein the first synchronizing piston is connectable to the first movable bearing housing by means of a first bracket, and wherein the second synchronizing piston is connectable to the second movable bearing housing by means of a second bracket.

* * * * *